United States Patent [19]

Kitazawa

[11] Patent Number: 4,481,643

[45] Date of Patent: Nov. 6, 1984

[54] AUTOMATIC EQUALIZER

[75] Inventor: Hiroo Kitazawa, Kumagaya, Japan

[73] Assignee: Tokyo Shibaura Denki Kabushiki Kaisha, Kawasaki, Japan

[21] Appl. No.: 394,439

[22] Filed: Jul. 1, 1982

[51] Int. Cl.³ .............................................. H04B 3/14
[52] U.S. Cl. ..................................... 375/12; 358/905; 333/18
[58] Field of Search ............... 375/11, 12, 14; 333/18, 333/166; 358/905; 364/724

[56] References Cited

U.S. PATENT DOCUMENTS

| | | | |
|---|---|---|---|
| 3,617,635 | 11/1971 | Hirsch | 375/12 |
| 4,071,827 | 1/1978 | Koike et al. | 333/18 |
| 4,201,959 | 5/1980 | Niiro et al. | 375/11 |
| 4,389,623 | 6/1983 | Onishi et al. | 333/18 |

OTHER PUBLICATIONS

S. Makino et al., "A Fully Automatic Ghost Canceller", IEEE Transaction CE-24, Aug. 3, 1978, p. 267.
S. Makino et al., "A Novel Automatic Ghost Canceller", IEEE Trans. CE-25, Aug. 4, 1979, p. 555.

Primary Examiner—Robert L. Griffin
Assistant Examiner—Stephen Chin
Attorney, Agent, or Firm—Cushman, Darby and Cushman

[57] ABSTRACT

An automatic equalizer has a transversal filter circuit for equalizing an input signal to be equalized and providing an equalized output according to the value of tap coefficients thereof. The transversal filter circuit includes a low-pass filter (LPF) at its output stage. The equalized output is subjected to a phase shift by the LPF. The equalized output is applied to a sign circuit as well as a wave integration circuit. The sign circuit generates a sign signal indicating a rate of change of the equalized output to time. The wave integration circuit generates a differentiated wave signal indicating the change of wave form or the change of amplitude information of the equalized output. The sign and wave signals are applied to a correlator which performs the correlation operation of the sign and wave signals and providing a tap coefficient control signal. This control signal is used for determining the tap coefficients of the transversal filter circuit.

14 Claims, 20 Drawing Figures

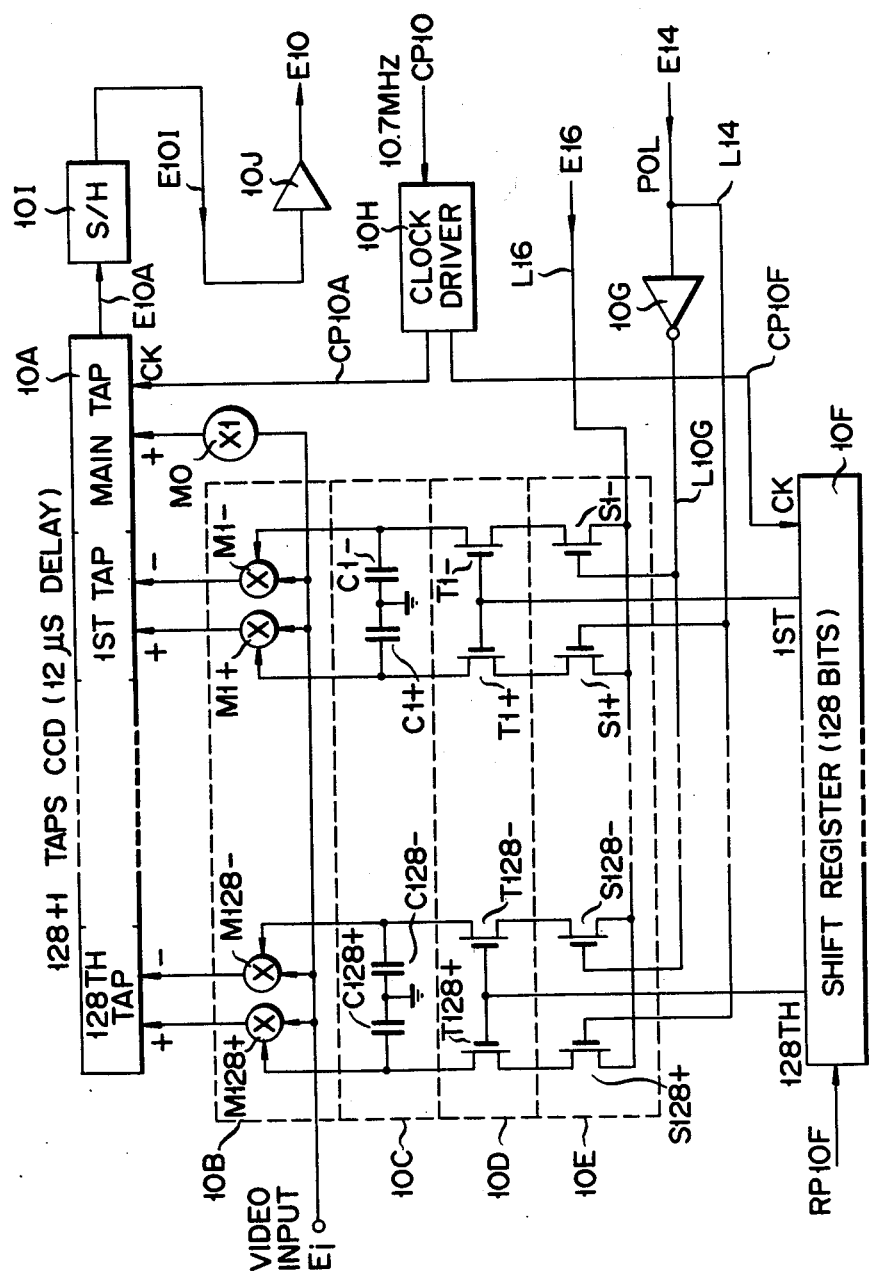

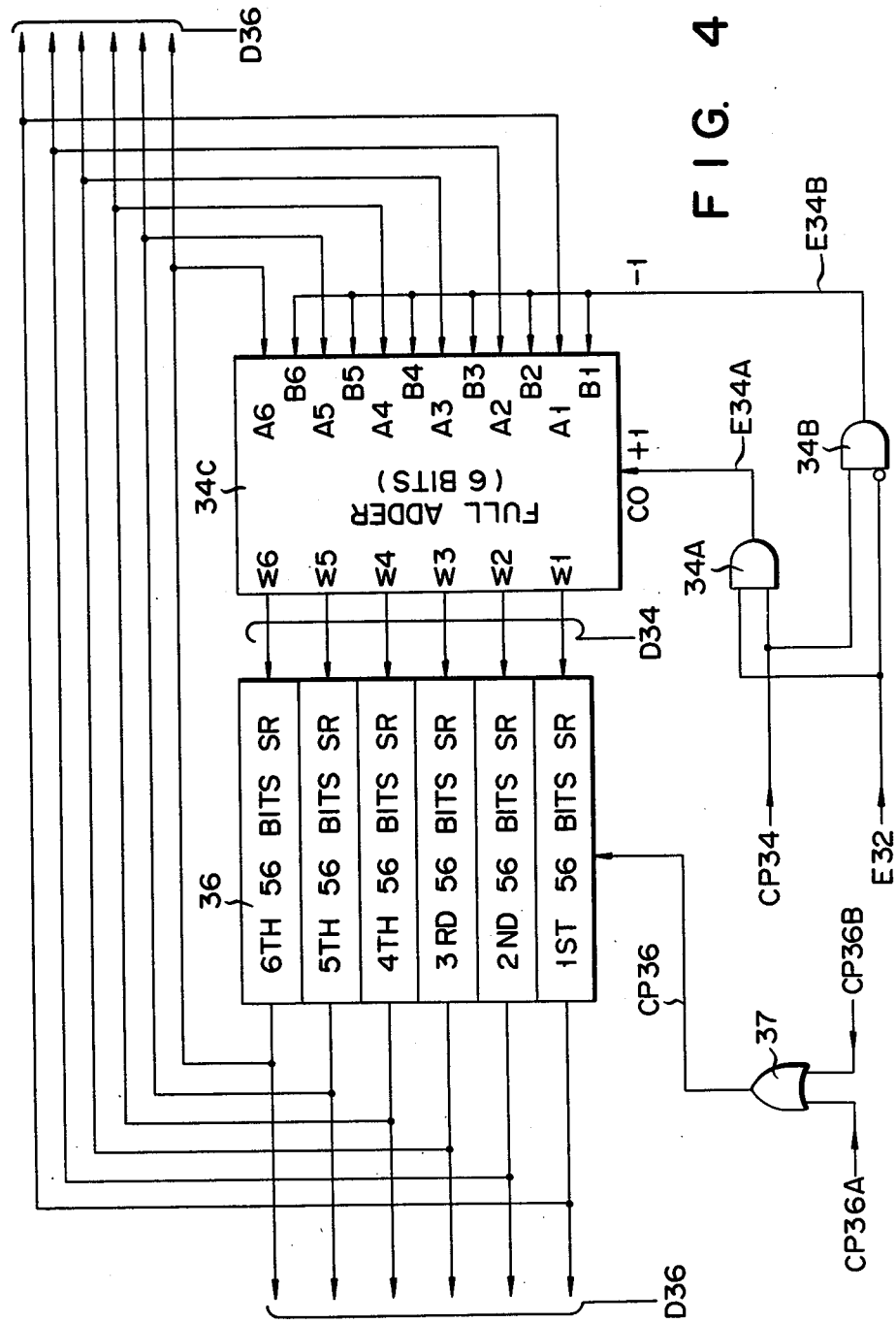

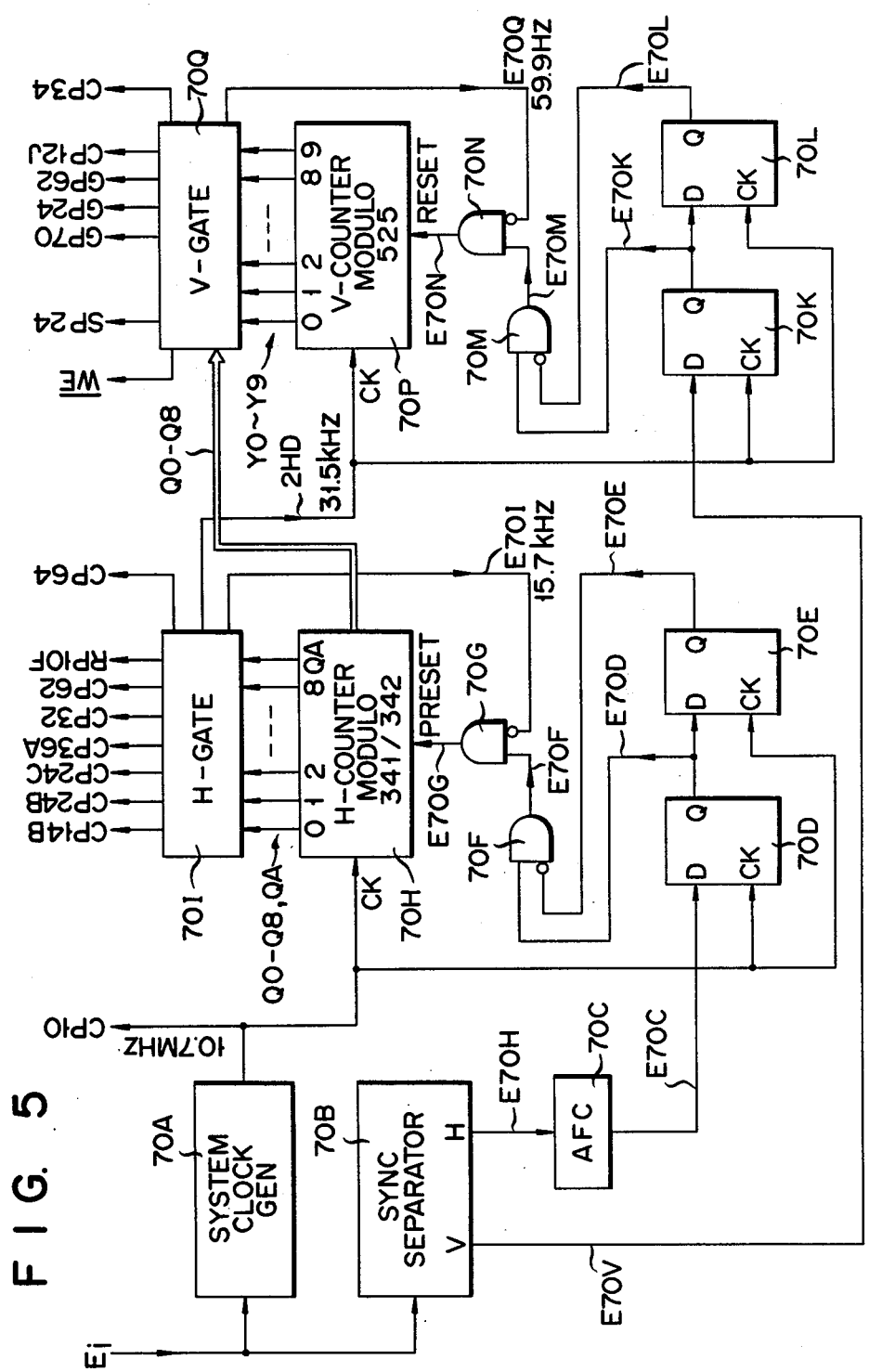

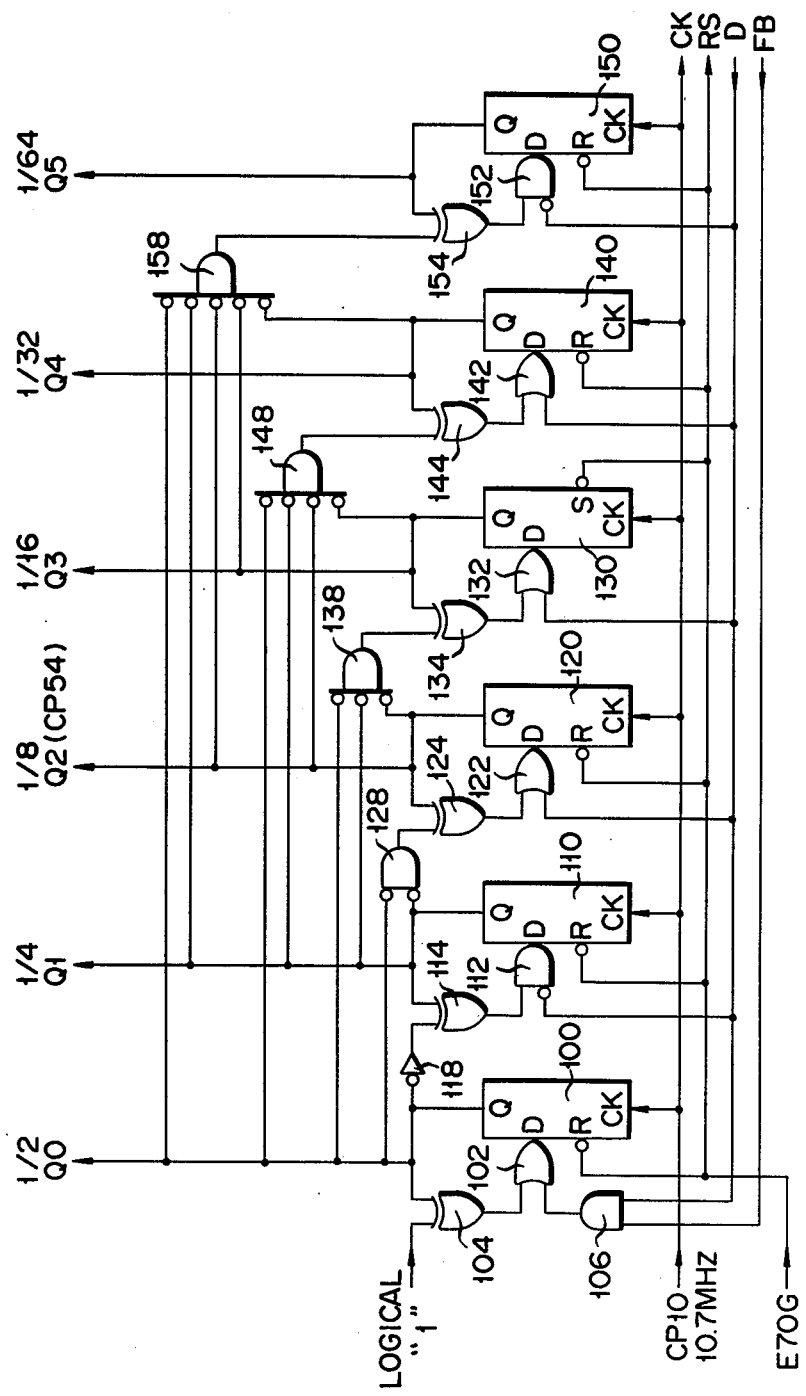
F I G. 6A

F I G. 6C
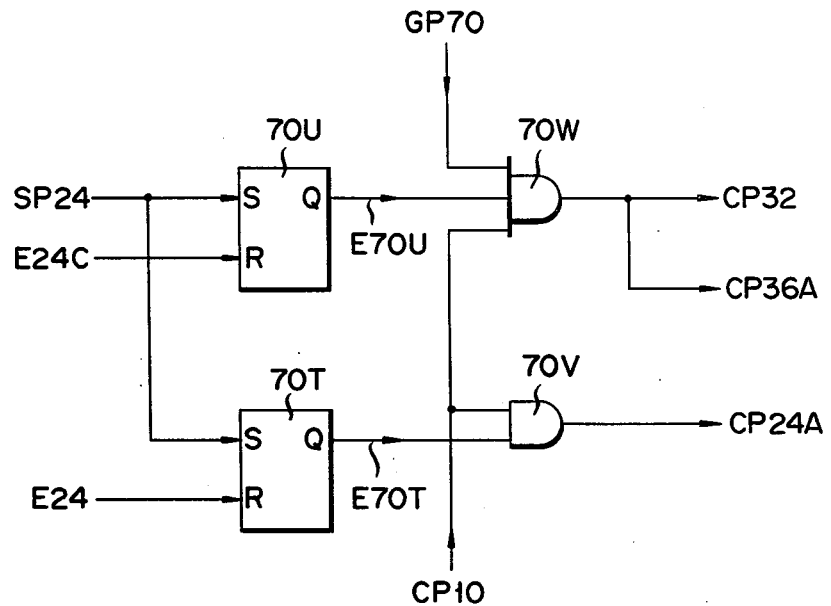

AUTOMATIC EQUALIZER

BACKGROUND OF THE INVENTION

This invention relates to a correlator implemented type automatic equalizer utilizing a transversal filter, which is useful for constituting a ghost canceller or the like.

An apparatus which removes distortion components in electric signals by controlling the tap coefficients of a transversal filter is called an automatic equalizer and is widely used as waveform equalizers and echo cancellers in signal transmission lines. Recently, an attempt is being made to use a correlator implemented type automatic equalizer for eliminating ghost or multipath signals in a TV receiver or the like. In such automatic equalizer, following arithmetic operation for correlation is performed:

$$d_k = \sum_{i=1}^{n} x_i \cdot sgn(y_{i+k}) \quad (1)$$

where k is integer (k=1, 2, ..., n), $x_i$ denotes the differentiation components of an input wave form to be equalized, $y_{i+k}$ denotes an equalized output $y_i$ with a parameter k, $sgn(y_{i+k})$ denotes the sign or polarity of $y_{i+k}$, and $d_k$ denotes the result of the correlation operation for determining the tap coefficient of the transversal filter.

A digital transversal filter requires a low-pass filter for smoothing a digital dispersive filtered output of the transversal filter to obtain a pure analog filtered output. The low-pass filter is also effective to eliminate unnecessary higher frequency components contained in the filtered output. Such low-pass filter inherently involves a phase shift or time delay. Thus, the phase of signal $y_{i+k}$ is different from that of signal $x_i$. For realizing accurate operation, however, the phase or the timing of occurrence of the signal $x_i$ must exactly be identical with that of the signal $y_{i+k}$. From this, neutralization of the phase difference should be effected on the signaL $x_i$ to eliminate the timing discrepancy between the signals $x_i$ and $y_{i+k}$.

In a prior art such as
Makino et al., "A Novel Automatic Ghost Canceller"

IEEE Trans. CE-26,3,p629, Aug. 1980,
the signal $x_i$ is obtained from the input circuit of a transversal filter. Accordingly, where said timing discrepancy has to be positively removed, then a delay circuit is specially provided in the circuit line of the signal $x_i$. Since the circuit components of this delay circuit are independent of the low-pass filter circuit, even though the timing discrepancy between these circuits is eliminated only at a specific condition, the timing discrepancy will unavoidably occur with time passage and/or temperature change. The timing discrepancy will cause the automatic equalizer to be unstable, to add derivative ghost components, or to undesirably oscillate. To escape such oscillation, the following relation should be always established:

$$|\tau_i - \tau_0| < T/2 \quad (2)$$

where $\tau_i$ denotes a delay time at the delay circuit, $\tau_0$ denotes a delay time at the low-pass filter, and T denotes a transmission time delay per one tap of the transversal filter.

Further to avoid said addition of derivative ghost components, the difference $|\tau_i - \tau_0|$ of equation (2) should be zero. According to the prior art, it is almost impossible to make the difference $|\tau_i - \tau_0|$ always zero. In practice, even the establishment of equation (2) irrespective of time passage or temperature change is hard to obtain.

SUMMARY OF THE INVENTION

It is accordingly the object of the present invention to provide an automatic equalizer having an improved stability relating to time passage and/or temperature change.

To achieve the above object, an automatic equalizer of the invention has a transversal filter circuit for equalizing an input signal to be equalized and providing an equalized output according to the value of tap coefficients thereof. The transversal filter circuit includes a delay element or a low-pass filter (LPF) at its output stage. The equalized output is subjected to time delay or a phase shift by the LPE. The equalized output is applied to a sign circuit as well as a wave integration circuit. The sign circuit generates a sign signal indicating a rate of change of the equalized output to time. The wave integration circuit generates a differentiated wave signal indicating the change of wave form or the change of amplitude information of the equalized output. The sign and wave signals are applied to a correlator which performs the correlation operation of the sign and wave signals and provides a tap coefficient control signal. This control signal is used for determining the respective tap coefficients of the transversal filter circuit.

According to the automatic equalizer having above configuration, since the input data applied to the sign circuit is identical with that applied to the wave integration circuit, no timing discrepancy between the wave signal and the sign signal will occur.

BRIEF DESCRIPTION OF THE DRAWINGS

FIG. 2 is one embodiment of a transversal filter 10 shown in FIG. 1;

FIG. 4 is one embodiment of an adder 34 and a wave memory 36 shown in FIG. 1;

FIG. 5 is one embodiment of a timing pulse generator 70 shown in FIG. 1;

FIGS. 6A and 6B jointly show one embodiment of an H-counter 70H shown in FIG. 5;

FIG. 6C is one embodiment of a gate circuit for generating pulses CP24A, CP32 and CP36A;

DETAILED DESCRIPTION OF THE PREFERRED EMBODIMENT

Description is now given with reference to the accompanying drawings of an automatic equalizer embodying this invention.

Figure 1:
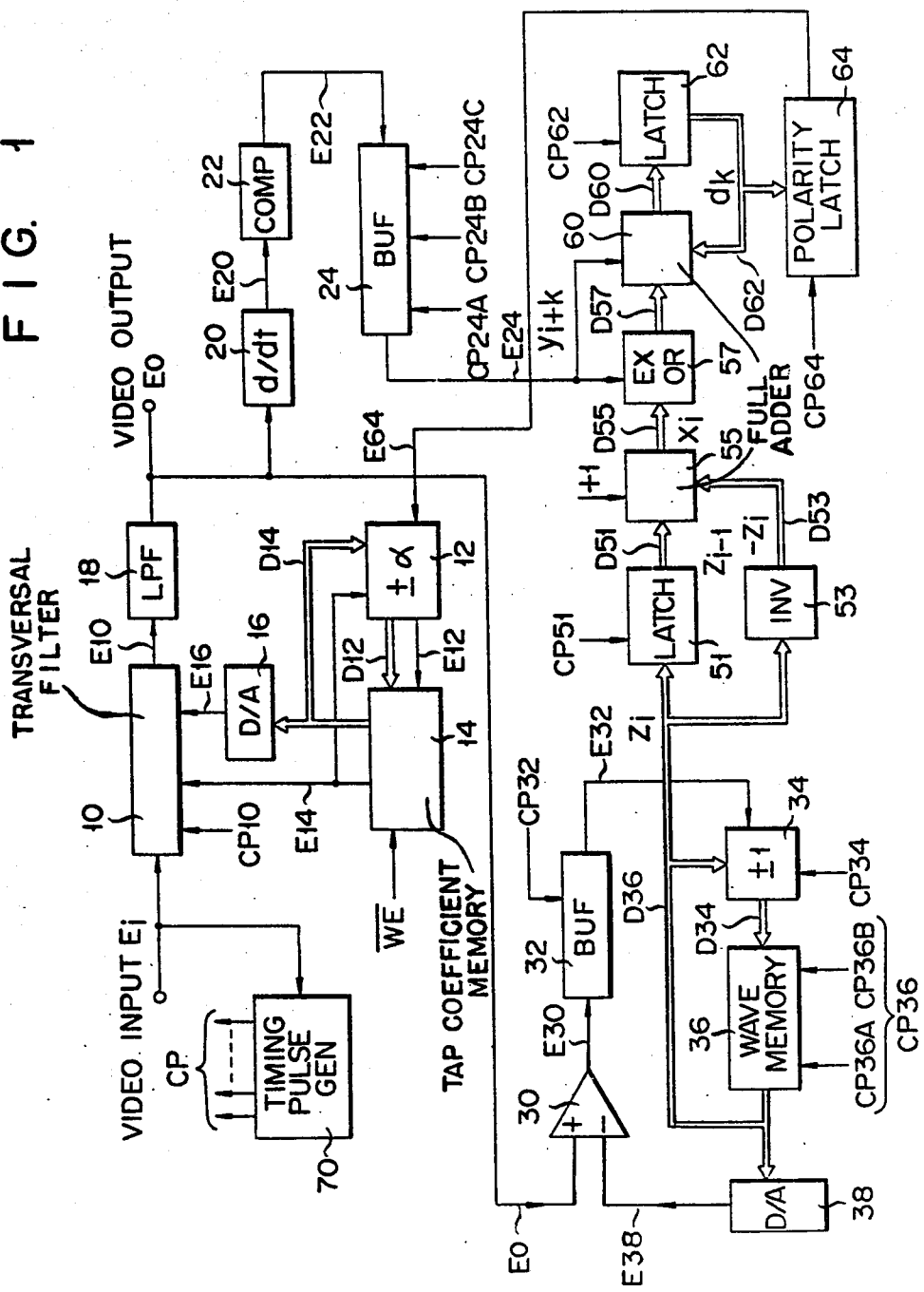
FIG. 1 shows a schematic diagram of an automatic equalizer according to the present invention.

Referring now to FIG. 1 there is shown an automatic equalizer according to the present invention. Here, the explanation will be given to the case where the equalizer of FIG. 1 is applied to a ghost canceller of a TV receiver.

A video input Ei, e.g. an NTSC type color video signal, is inputted to a transversal filter 10. Filter 10 transfers the input Ei with given tap coefficients and outputs a filtered output E10 which is a digital and dispersive signal. This dispersive output E10 is changed to an analog video output Eo via a low-pass filter (LPF) 18. Filter 10 may be a CCD analog delay line with 128 taps. The frequency of a clock pulse CP10 for clocking filter 10 should be double or more the maximum frequency of input Ei from the Nyquist's sampling theorem, that is, pulse CP10 should be 9 MHz or more since input Ei will contain the frequency component of 4.5 MHz. Here, the frequency of $3f_{sc} \approx 10.7$ MHz is used for pulse CP10 ($f_{sc} \approx 3.58$ MHz is the frequency of a color subcarrier). The use of an integral frequency of $f_{sc}$ is advantageous that a beat interference between the sampling frequency of pulse CP10 and the color subcarrier frequency $f_{sc}$ can be avoided. Further, since the frequency $f_{sc}$ is obtained from an APFC (Automatic Phase Frequency Controller) utilizing a crystal oscillator, where pulse CP10 is derived from $f_{sc}$, then pulse CP10 is little affected by ghost signals or noises. Accordingly, in a ghost canceller, $3f_{sc}$ or $4f_{sc}$ is preferable to the sampling clock CP10. The delay time per one tap in transversal filter 10 is about 93 ns ($\frac{1}{3}f_{sc}=1/10.7$ MHz), thus about 12 μs of delay time will be obtained from 128 taps. Therefore, it is possible to cancel in filter 10 ghost components within the time delay of 12 μs.

Each of tap coefficients of the filter 10 is determined by a weighting signal E16 and polarity thereof is designated by a polarity signal E14. Signals E14 and E16 are obtained from a tap coefficient memory (TCM) 14 and a digital to analog (D/A) converter 16, respectively. Converter 16 converts a digital output D14 obtained from TCM 14 into signal E16 (analog). Signal E14 and output D14 are applied to an adder 12 which adds a given constant ($+\alpha$ or $-\alpha$) to output D14 according to a tap coefficient control signal E64. How to obtain signal E64 will be described latter. Adder 12 supplies TCM 14 with a digital output D12 and a sign signal E12. Output D12 corresponds to the digital sum of output D14 and the given constant ($\pm\alpha$), and signal E12 indicates the sign of output D12. The contents of TCM 14 is renewed by a write enable pulse $\overline{WE}$ according to output D12 and signal E12. Namely, the tap coefficients of filter 10 can be changed every time pulse $\overline{WE}$ is inputted to TCM 14. In this embodiment, the repetition period of pulse $\overline{WE}$ is the same as the horizontal scanning period of a TV signal.

The components 10 to 18 form a transversal filter circuit for equalizing or ghost-cancelling the video input Ei according to the tap coefficient control signal E64 to provide the equalized video output Eo.

The video output Eo derived from LPF 18 is inputted to a differentiator 20. Differentiator 20 differentiates output Eo and provides a differentiated signal E20 indicating a rate of change of the output Eo amplitude to time. Signal E20 is inputted to a comparator 22. Comparator 22 compares signal E20 with a given reference level and provides a digital signal E22 which indicates the porality of differentiated signal E20. Signal E22 is loaded into a buffer 24 by a loading pulse CP24A (10.7 MHz). By such loading, buffer 24 memorizes specific positions of the wave form of output Eo as well as their polarity (sign). To be concrete, the signal edge of vertical synchronization pulse and ghost components corresponding to this signal edge are sequentially converted to signals E22, and these signals E22 are loaded into buffer 24. After this loading, buffer 24 sequentially outputs the loaded contents as a sign signal E24 according to reading out pulses CP24B (2.68 MHz) and CP24C (48.7 kHz). When signal E24 is represented by "$y_{i+k}$", the parameter "i" is changed by pulse CP24B, and the parameter "k" is changed by pulse CP24C.

The components 20 to 24 are used as a sign circuit for generating from the video output Eo the sign signal E24 or $y_{i+k}$ according to the pulses CP24A to CP24C. The signal E24 represents the sign ($\pm$) of a rate of change (d/dt) of output Eo.

The video output Eo is applied to the positive input of an analog comparator 30. Comparator 30 receives its negative input a signal E38 and compares output Eo with signal E38 to provide a digital comparison result E30. The logical level of result E30 is "1" when Eo>E38 and is "0" when Eo<E38. Result E30 is loaded into a buffer 32 by a loading pulse CP32. Buffer 32 may be a shift register. Each of stored contents of buffer 32 is sequentially read out of buffer 32 as a signal E32 by pulse CP32. Signal E32 is applied to an adder 34. Adder 34 receives a wave signal D36 (digital data) and adds +1 or −1 to signal D36 according to the logical level of signal E32, then adder 34 outputs an added result D34 (digital). The contents of result D34 is changed by ±1 from the contents of signal D36. Result D34 is loaded into a wave memory 36 by a loading pulse CP36A. At the time of data writing, the clock timing of pulse CP36A may be the same as that of pulse CP32. Memory 36 outputs the signal D36. Signal D36 is converted by a D/A converter 38 into said signal D38. In this circuitry, the wave form of the video output Eo is divided into fragments along time base in accordance with the loading pulse CP36A, and the amplitude components of respective fragments are sequentially stored in the wave memory 36.

Incidentally, the adding operation at adder 34 is controlled by an operation enabling pulse CP34. That is, adder 34 adds +1 or −1 to signal D36 according to signal E32 only when pulse CP34 enables such addition.

After said loading of result D34 into memory 36 is completed, the loaded contents of memory 36, i.e. the signal D36, is read out of memory 36 by a reading pulse CP36B. The signal D36 is applied to a latch 51 and an inverter 53. Assume now that a fragmentary component of signal D36 along time is denoted as $Z_i$ (here the suffix i is an integer and is changed by pulse CP36B), that the loaded contents in latch 51 is $Z_{i-1}$, and that the contents of latch 51 is renewed by a pulse CP51 which subsequently appears just after the disappearance of pulse CP36B. In this case, an output D51 of latch 51 and an output D53 of inverter 53 correspond to $Z_{i-1}$ and $-Z_i$ (or to $Z_i$ and $-Z_{i+1}$), respectively.

Outputs D51 and D53 are applied to a full adder 55. Adder 55 already receives data of digital "1" for two's complement. Adder 55 adds output D53 to output D51 and provides an added result D55. That is, where the contents of result D55 is denoted as $x_i$, then $$x_i = Z_{i-1} - Z_i \qquad (3)$$

Equation (3) indicates that the result D55 corresponds to the change of wave form or the change of amplitude information of the equalized output Eo. In other words, the result D55 contains the differentiated information of wave signal D36. Thus, the result D55 may be said to be a differentiated wave signal.

The components 30–55 form the wave integration circuit for generating a differentiated wave signal D55 (= $x_i$) from the video output Eo.

Figure 1A:
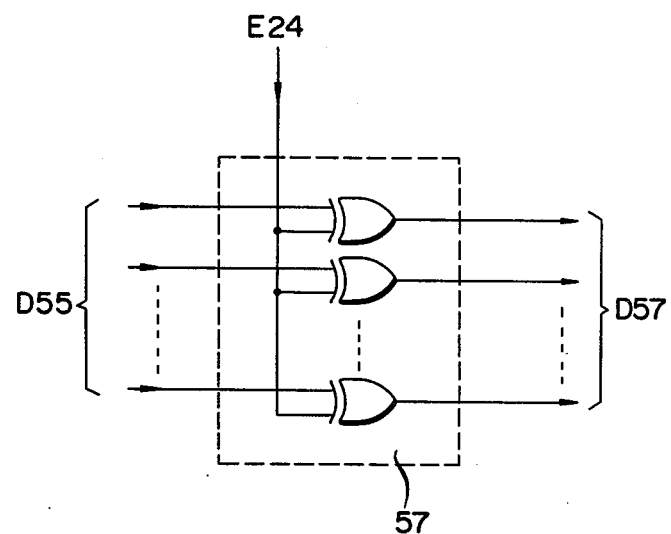
FIG. 1A is one embodiment of EX OR gate 57 shown in FIG. 1.

The differentiated wave signal D55 is applied to an EX OR gate 57 having a configuration as shown in FIG. 1A. Gate 57 receives said sign signal E24. Where signal E24 contains information of $y_{i+k}$=logical "0", then gate 57 directly passes signal D55 and provides an gated result D57 which corresponds to "$x_i(+y_{i+k})$". Where signal E24 contains information of $y_{i+k}$=logical "1", then gate 57 inverts the sign of signal D55 and provides gated result D57 corresponding to "$x_i(-y_{i+k})$".

Figure 1B:
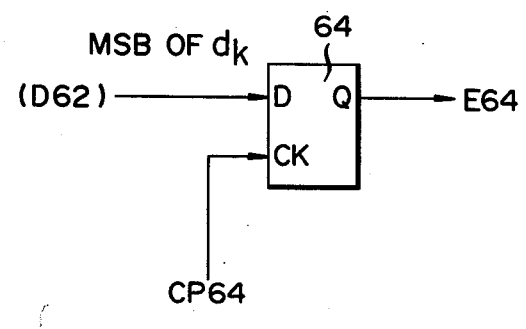
FIG. 1B is one embodiment of a polarity latch 64 shown in FIG. 1.

The gated result D57 is applied to a full adder 60. Adder 60 also receives the sign signal E24 and an accumulated result D62. When E24=$y_{i+k}$=logical "0", adder 60 adds the result D57=$x_i(+y_{i+k})$ to the result D62 to provide an added output D60. When E24=logical "1", adder 60 adds the result D57=$x_i(-y_{i+k})$ to the result D62 and provides the output D60. In this case, adder 60 functions as a subtractor and logical "1" of signal E24 serves as the two's complement. Output D60 is loaded into a latch 62 according to a correlation control signal CP62. The loaded contents of latch 62 is the accumulated result D62 which represents a correlation data $d_k$. The most significant bit (MSB) of data $d_k$ is applied to a polarity latch 64. Latch 64 latches or stores the polarity (sign) of data $d_k$ when an enabling pulse CP64 is applied. Latch 64 outputs said tap coefficient control signal E64 whose logical level indicates the polarity of data $d_k$. Latch 64 may be formed of a D type flip-flop 64 as shown in FIG. 1B.

The components 57–64 are used as a correlator circuit for correlating the sign signal E24($y_{i+k}$) with the differentiated wave signal D55 according to the correlation control signal CP62.

The whole operation timing of the ghost canceller is governed by a timing pulse generator 70 to which the video input Ei is applied. That is, generator 70 generates the pulses CP10–CP64, etc. with a given timing according to synchronizing signals contained in the video input Ei so that the operation of the ghost canceller is regulated.

Assume here that the accumulation times at the correlator circuit (57–64) are m. In this case, $$d_k = \sum_{i=1}^{m} x_i \cdot \text{sgn}(y_{i+k}) \qquad (4)$$

is obtained. Where the Kth tap coefficient of the transversal filter 10 is $C_K$ and the result of N time correlation for the coefficient $C_K$ is $C_K^N$, then the N+1 time correlation result $C_K^{N+1}$ is $$C_K^{N+1} = C_K^N - \alpha \cdot \text{sgn}(d_k) \qquad (5)$$

where $\alpha$ is a given positive constant of the adder 12. When the ghost component is eliminated, the parameters $y_{i+k}$ and $d_k$ become zero. At this time, the tap coefficient $C_K^N$ is converged to the stable state of $C_K^{N+1}=C_K^N$ as seen from equation (5), and $d_k$ is minutely vibrated around the zero level. In the present embodiment, the constant $\alpha$ is selected to the value of "1", for example.

FIG. 2 shows a detailed configuration of one embodiment of the transversal filter 10. The video input Ei is applied via a pad M0 to the positive input of the main tap of an analog delay line 10A. Line 10A may be a Charge-Coupled Device (CCD) 10A having 128 taps and one main tap. Input Ei is also applied to each multiplicand input of analog multipliers M1+− to M128+−. These multipliers jointly form a weighting circuit 10B. The outputs of multipliers M1+ and M1− and coupled to the positive and negative inputs of the first tap of CCD 10A, respectively. Similarly, the respective positive/negative outputs of multipliers M2+− to M128+− are coupled to the respective positive/negative inputs of 2nd to 128th taps of CCD 10A.

CCD 10A receives a shifting clock pulse CP10A outputted from a clock driver 10H. Driver 10H generates pulse CP10A of 10.7 MHz according to the clock pulse CP10. CCD 10A transfers each output of weighting circuit 10B with the clock timing of pulse CP10A. Since CP10A ≈ 10.7 MHz and CCD 10A has 128 taps for delaying the outputs of circuit 10B, CCD 10A permits to transfer the outputs of circuit 10B with about 12 μs ($\approx$128/10.7 MHz) delay at maximum. A delayed output E10A of CCD 10A is applied to a sample/hold circuit 10I. Circuit 10I converts the output E10A into a signal E10I. Signal E10I is inputted to a buffer amplifier 10J and amplifier 10J outputs said filtered output E10.

The multipliers M1+− to M128+− are coupled to the respective ends of capacitors C1+− to C128+−. The other end of each of capacitors C1+− to C128+− is grounded. Capacitors C1+− to C128+− form a weighting memory circuit 10C. The multipliers or coefficients of multipliers M1+− are respectively determined by the charged voltages of capacitors C1+−. Similarly, the multipliers of respective multipliers M2+− to M128+− depend on the respective charged voltages of capacitors C2+− to C128+−.

One end of capacitor C1− is coupled to a signal line L16 via the drain-source path of a MOS transfer gate transistor T1− and the drain-source path of a MOS switch transistor S1−. Line L16 is coupled to the D/A converter 16 of FIG. 1 and transmits analog information of signal E16. One end of capacitor C1+ is coupled to line L16 via the drain-source path of a MOS transfer gate transistor T1+ and the drain-source path of a MOS switch transistor S1+. Similarly, each end of capacitors C2− to C128− is coupled to line L16 via each series circuit of transistors T2−, S2− to transistors T128−, S128−. Each end of capacitors C2+ to C128+ is coupled to line L16 via each series circuits of transistors T2+, S2+ to transistors T128+, S128+.

The transistors T1+− to T128+− form a transfer gate circuit 10D, and the transistors S1+− to S128+− form a weighing polarity selection circuit 10E. Circuit 10E selectively couples line L16 to circuit 10D according to the logical level of signal E14. Circuit 10D transfers a signal level of signal E16 passing through the selected one of transistors S1+ — to S128+ — to the corresponding one of capacitors C1+ — to C128+ —.

The gates of transistors T1+ — are connected to the first bit of a shift register 10F. Similarly, the respective gates of transistors T2+ — to T128+ — are connected to the 2nd to 128th bits of register 10F. Register 10F receives a refresh start pulse RP10F and a shifting clock pulse CP10F. Register 10F shifts the inputted pulse RP10F from 128th bit side to 1st bit side by pulse CP10F. Pulse RP10F is obtained from the timing pulse generator 70 shown in FIG. 1 and has the same frequency as the horizontal synchronizing signal (15.7 kHz) of TV system. Pulse CP10F is obtained from the driver 10H and has the same frequency as pulse CP10 (10.7 MHz).

The gates of transistors S1+ to S128+ are connected to a signal line L14 to which the polarity signal E14 is applied. The gates of transistors S1— to S128— are connected to an output line L10G. Line L14 is coupled via an inverter 10G to line L10G. Thus, the phase of line L10G is opposite to that of line L14. Accordingly, for instance, logical level "1" of signal E14 renders transistors S1+ to S128+ turned on while transistors S1— to S128— turned off. When signal E14 has logical level "0", transistors S1+ to S128+ are turned off and transistors S1— to S128— are turned on. To be concrete, where signal E14 is logical "1" and the first bit of shift register 10F is logical "1", then transistors T1+ — and S1+ to S128+ are turned on, and signal E16 is applied only to capacitor C1+. In this case, the first tap coefficient of CCD 10A is determined by the analog information of "+E16" stored in capacitor C1+. Where E14="0", then the first tap coefficient is determined by "—E16". In this way, the tap coefficient of each tap of CCD 10A is determined by the logical level (polarity) of signal E14 and the magnitude or amplitude of signal E16. A positive distortion components (ghost) contained in input Ei are canceled according to the charged voltages of capacitors C1— to C128—, and a negative distortion components are canceled according to the charged voltages of capacitors C1+ to C128+. To retain the tap coefficient of each tap to a given degree, the charged voltage of each of capacitors C1+ — to C128+ — is refreshed in synchronism with the shifting operation of register 10F.

Figure 2A:
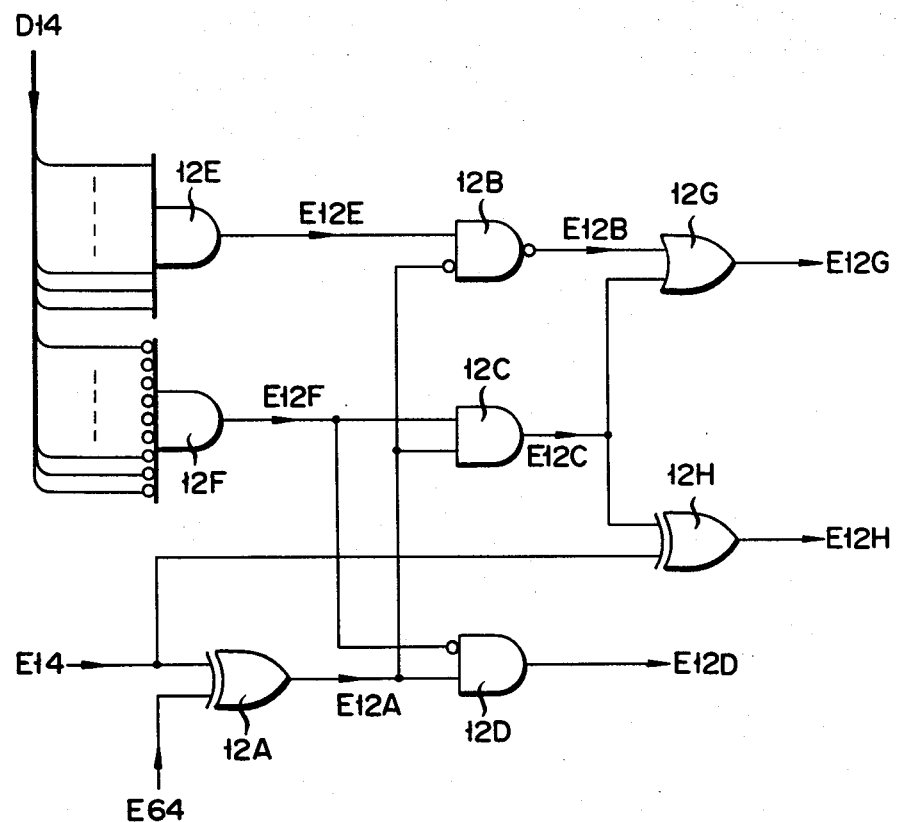
FIGS. 2A and 2B are embodiments of an adder 12 and a tap coefficient memory 14 shown in FIG. 1.
Figure 2B:
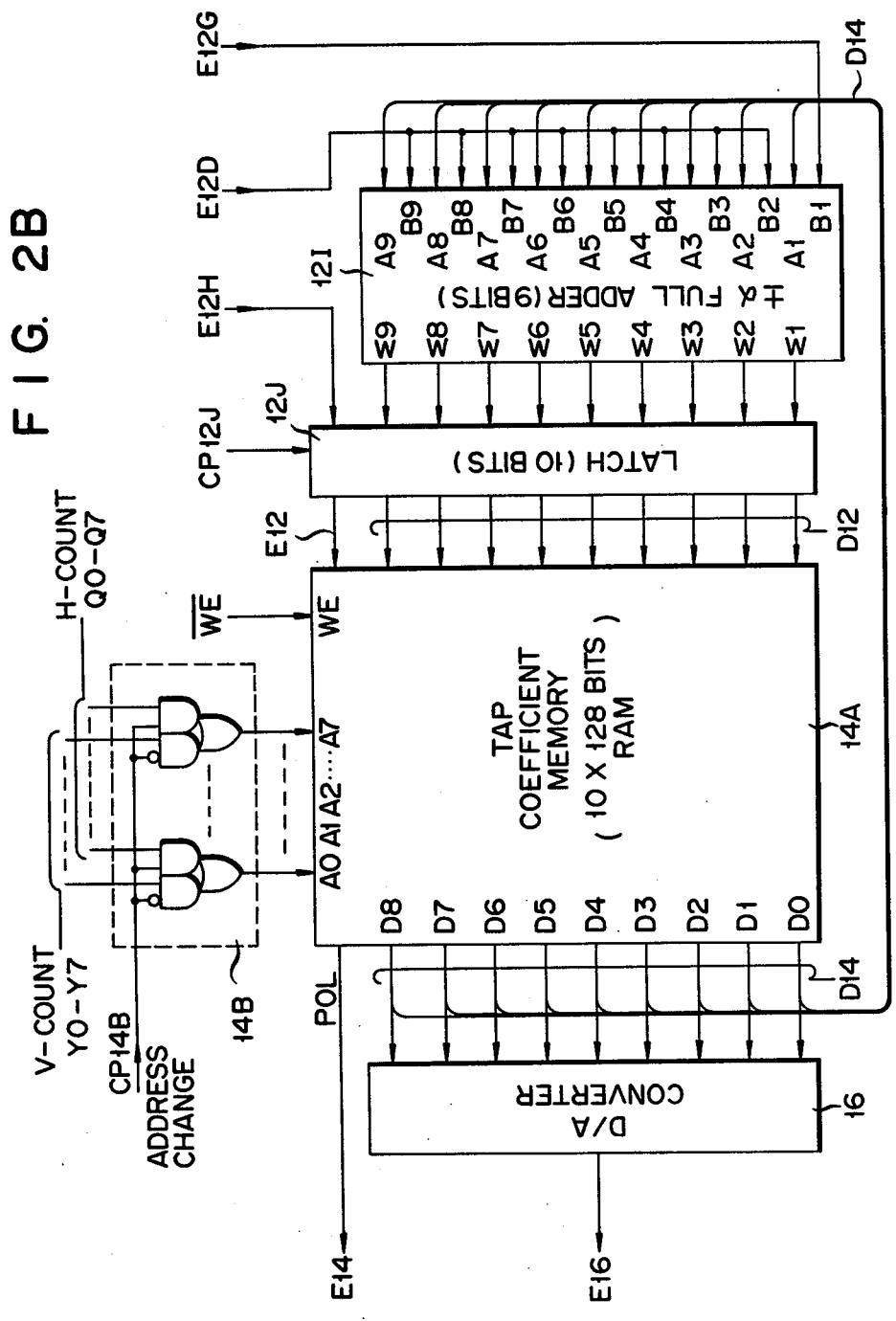

FIGS. 2A and 2B show a detailed configuration of one example of the adder 12 and tap coefficient memory 14 shown in FIG. 1.

In FIG. 2A, the tap coefficient control signal E64 is applied to an input of an EX OR gate 12A. The other input of gate 12A receives the polarity signal E14. An output E12A of gate 12A is applied to an inverted input of a NAND gate 12B as well as each input of AND gates 12C and 12D. The other input of gate 12B receives an output E12E of an AND gate 12E. Gate 12E has nine inputs to which nine-bit digital output D14 is applied. Output D14 is also applied to nine inverted inputs of an AND gate 12F. An output E12F of gate 12F is applied to the other input of gate 12C and to an inverted input of gate 12D. An output E12B of gate 12B is applied to one input of an OR gate 12G. An output E12C of gate 12C is applied to the other input of gate 12G and to one input of an EX OR gate 12H. Gate 12H receives at the other end the polarity signal E14.

An output E12D of the gate 12D (FIG. 2A) is applied to inputs B2 to B9 of a nine-bit full adder 12I (FIG. 2B). An output E12G of gate 12G is inputted to an input B1 of adder 12I. An output E12H of gate 12H is inputted to one bit of a ten-bit latch 12J. Latch 12J receives respective outputs Σ1 to Σ9 of adder 12I. Latch 12J stores output E12H and output Σ1 to Σ9 of adder 12I when a loading pulse CP12J is applied. The contents of latch 12J, i.e. the sign signal E12 and digital output D12, are supplied to a memory (RAM) 14A. RAM 14A may be formed of ten parallel arranged 128 bits memory stacks. The address of each 128 bits memory of RAM 14A is designated by outputs A0 to A7 of an address gate 14B. The outputs A0 to A7 are determined by V-counter outputs Y0 to Y7 or by H-counter outputs Q0 to Q7. Detailed for H- and V-counters will be described latter. Which output is used as the output of A0 to A7 is determined by an address change gate pulse CP14B. RAM 14A is permitted to accept inputted data E12 and D12 when the write enable pulse $\overline{WE}$ is applied to a write enable input WE. That is, when RAM 14A performs the read/write operation, pulse CP14B is logical "0" and the address of RAM 14A is designated by outputs Y0-Y7. When the refreshment for capacitors C1+ — to C128+ — are carried out, pulse CP14B is logical "1" and the address thereof is designated by outputs Q0-Q7.

The circuitry of FIGS. 2A and 2B will operate as follows.

When the logical level of signal E14 is the same as that of signal E64, output E12A of gate 12A is logical "0" and thus output E12D is logical "0". Accordingly, inputs B2 to B9 of adder 12I are all "0". When logical levels of data D0 to D8 corresponding to the output D14 are not all "1", output E12E of gate 12E is "0". Then, output E12B of gate 12B is "1", and signal E12G is "1". From this, input B1 of adder 12I is "1". Where B1 is "1" and B2 through B9 are all "0", then adder 12I adds +α to respective data D0 to D8 of output D14. In this embodiment, +α is selected to +1.

When all logical levels of output D14 are "1", output E12E is logical "1". Where output E12A is "0" and output E12D is "0", then outputs E12B and E12C are both "0", and output E12G is "0". Thus, the logical levels at inputs B1 to B9 are all "0". In this case, adder 12I adds +0 to data D0 through D8, or carries out no addition.

When the logical level of signal E14 is different from that of signal E64, the output E12A is logical "1". When data D0 to D8 of output D14 are not all "0", output E12F of gate 12F is "0", and output E12C is "0". Since E12A="1" and E12F="0", the logical level of output E12D is "1". Since E12A="1", the logical level of output E12B is "1", and thus E12G="1". Accordingly, the logical levels at the inputs B1 to B9 of adder 12I are all "1". In this case, adder 12I adds —α to data D0 through D8, and the logical level of signal E12H is the same as that of polarity signal E14 for E12C="0".

When data D0 to D8 are all "0", output E12F is "1". Where E12F="1" and E12A="1", then E12C="1" and E12G="1". In this case, EX OR gate 12H functions as an inverter. That is, gate 12H inverts the polarity of signal E14. Further, since E12G="1", input B1 of adder 12I is "1", then adder 12I adds +α to data D0 through D8.

Figure 3:
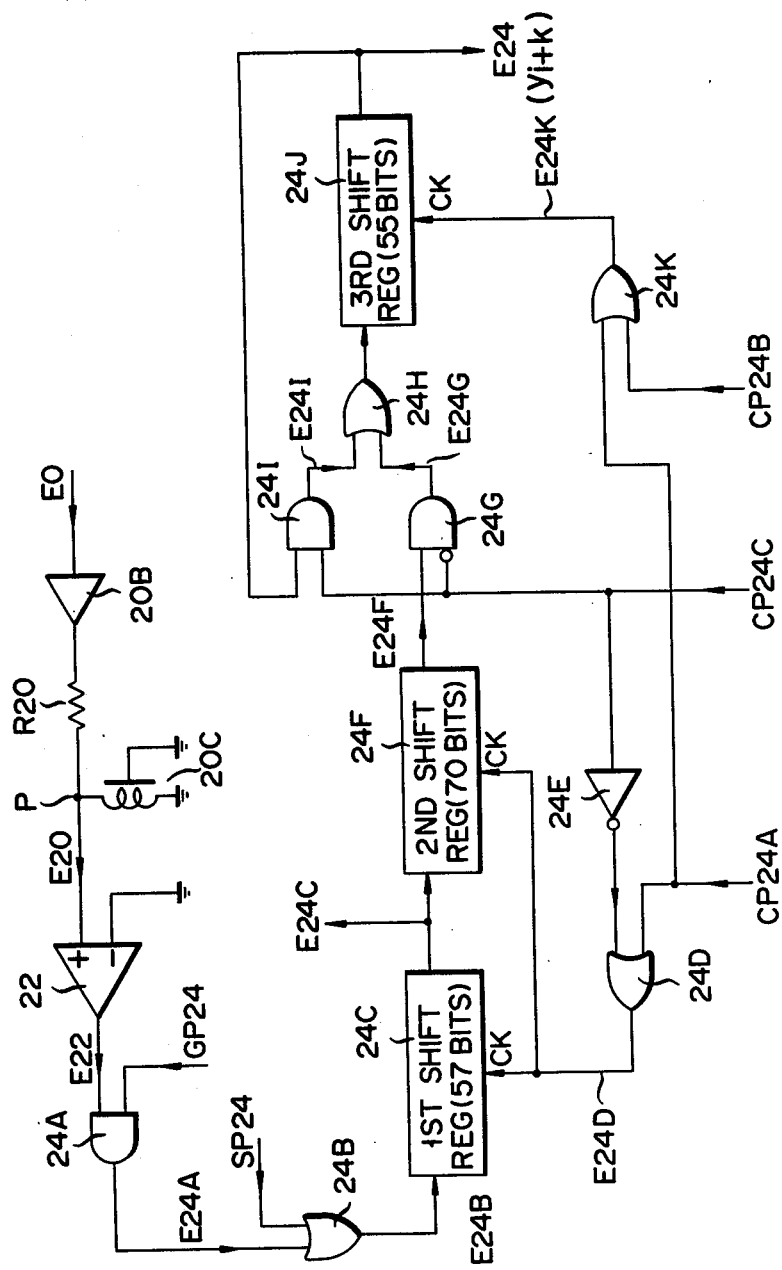
FIG. 3 is one embodiment of a sign circuit 20-24 shown in FIG. 1.

FIG. 3 is one embodiment of a sign circuit (20-24) shown in FIG. 1. The video output Eo is applied to a buffer amplifier 20B. The output of amplifier 20B is grounded through a series circuit of a resistor R20 and a delay line 20C. The delay time of delay line 20C is 23.4 ns. Delay line 20C absorbs a signal at the juncture point P between resistor R20 and delay line 20C and reflects the absorbed signal at the ground side and feeds back the reflected signal to the point P with time delay of 46.8 ns (=23.4 ns×2). Resistor R20 and delay line (inductor with capacitance) 20C form a differentiator.

A differentiated output E20 is obtained from the point P. Since the time delay of 46.8 ns corresponds to the phase delay of $\pi$ at 10.7 MHz (3 $f_{sc}$), the fed back signal of delay line 20C cancels a subsequent signal of 10.7 MHz at point P. Therefore, the differentiator has null points at 10.7 MHz and its integer multiplied frequencies. This is advantageous that the sign circuit and its following circuitries are little affected by the system clock noise of 10.7 MHz and its harmonics components contained in the video output Eo. The output E20 has a substantive positive or negative potential when the level of video output Eo is changed.

The output E20 is applied to the positive input of comparator 22. The negative input of comparator 22 is grounded. Thus, the comparison level of comparator 22 is the ground level or zero potential. Comparator 22 outputs a comparison result E22. The logical level of result E22 is "1" when output E20 has a positive potential. Where output E20 is negative, then result E22 is "0". Result E22 is applied to one input of an AND gate 24A. The other input of gate 24A receives a gate pulse GP24. Gate 24A permits result E22 to pass therethrough when pulse GP24 is logical "1". An output E24A of gate 24A is applied to one input of an OR gate 24B. The other input of gate 24B receives a start pulse SP24 whose logical level is temporarily "1" at the time when the data reading or data storing is commenced. An output E24B of gate 24B is inputted to a first shift register (SR) 24C having a capacity of 57 bits.

The loading pulse CP24A is applied to respective inputs of OR gates 24D and 24K. Gate 24K receives at the other input the loading pulse CP24B and outputs a shifting clock pulse E24K. The loading pulse CP24C is applied via an inverter 24E to the other input of gate 24D. Gate 24D outputs a shifting clock pulse E24D. Pulse E24D clocks the SR 24C to shift the inputted data of output E24B.

After clocking of 57 bits is carried out, the SR 24C outputs a first shifted pulse E24C. Pulse E24C is inputted to a second SR 24F having 70 bits. SR 24F is clocked by pulse E24D. When the shift of 70 bits is completed, SR 24F outputs a second shifted pulse E24F. Pulse E24F is inputted to an AND gate 24G. An inverted input of gate 24G receives the pulse CP24C. An output E24G of gate 24G is supplied via one input of an OR gate 24H to a third SR 24J having 55 bits. SR 24J is clocked by the pulse E24K and outputs the sign signal E24($Y_{i+k}$) after the completion of 55 bits shifting. Signal E24 is applied to one input of an AND gate 24I which receives at the other input the pulse CP24C. An output E24I of gate 24I is also supplied via the other input of gate 24H to SR 24J.

The operation of FIG. 3 configuration will be described latter.

The circuitry as to the SR 24C, 24F and 24J may be SHIFT REGISTER CONTROL DEVICE of the Japanese Utility Model Application No. 54-126698 filed by the same assignee (TOSHIBA CO.) as the present application. This Japanese application corresponds to the Public Utility Model Disclosure No. 56-46100 which was laid open on Apr. 24, 1981. The disclosure of this Utility Model Application is now combined herewith.

FIG. 4 is one embodiment of adder 34 and wave memory 36 shown in FIG. 1.

The signal E32 obtained from buffer 32 is inputted to one input of an AND gate 34A as well as an inverted input of an AND gate 34B. The other input of each of gates 34A and 34B receives the enabling pulse CP34. An output E34A of gate 34A is applied to a carry out input CO of a 6-bit full adder 34C. An output E34B of gate 34B is applied to each of inputs B1 to B6 of adder 34C. Adder 34C receives the wave signal D36 at its each of inputs A1 to A6. Outputs Σ1 to Σ6 of adder 34C, or the added result D36, are inputted to respective 56-bit shift registers of memory 36. Each shift register of memory 36 shifts the inputted data according to the clocking of a timing pulse CP36. Pulse CP36 is obtained from an OR gate 37 which receives the pulses CP36A and CP36B. Thus, pulse CP36 is CP36A or CP36B.

The circuitry of FIG. 4 will operate as follows.

When the enabling pulse CP34 is logical "0", the logical levels of outputs E34A and E34B are both "0", and adder 34C adds +0 to signal D36 or performs no addition. Thus, the wave signal D36 is circurated among adder 34C and memory 36 without change of its contents.

Where the pulse CP34 is logical "1", then adder 34C adds +1 or −1 to signal D36 according to the logical level of signal E32.

When CP34="1" and E32="1", output E34A="1" and output E34B="0". In this case, adder 34C adds +1 to signal D36, and contents of each of outputs Σ1 to Σ6 are incremented by "+1" when the circuration of signal D36 is carried out.

When CP34="1" and E32="0", output E34A="0" and output E34B="1". In this case, adder 34C adds "−1" to signal D36, and contents of each added result D34 are incremented by "−1", or decremented by "+1", with each circuration of signal D36.

Incidentally, the above-mentioned circulation of signal D36 is performed in synchronizm with the horizontal synchronization signal of TV system.

Figure 7:
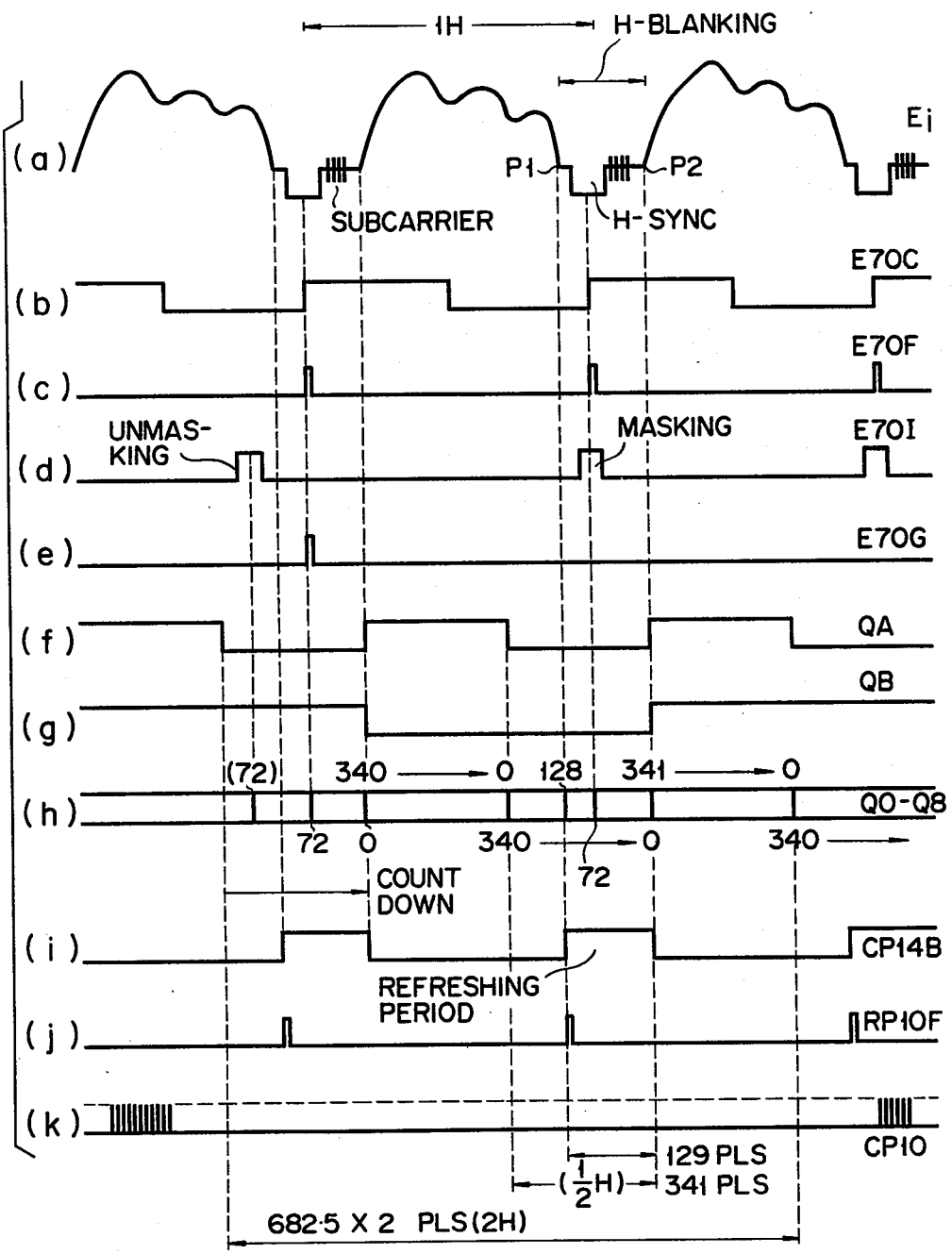
FIGS. 7 and 8 are timing charts illustrating the operation of the H-counter 70H and H-gate 70I.

FIG. 5 is an embodiment of a timing pulse generator 70 shown in FIG. 1. FIG. 7 is a timing chart illustrating the operation of a H-counter 70H shown in FIG. 5.

The video input Ei is applied to a system clock generator 70A and a sync signal separator 70B. Generator 70A includes a voltage controlled oscillator (VCO) having a 10.7 MHz crystal. The VCO of generator 70A generates the system clock pulse CP10 of 10.7 MHz which is exactly identical with the three times of 3.58 MHz color subcarrier contained in video input Ei (FIG. 7a). Separator 70B separates from input Ei a horizontal synchronization (H-sync) signal E70H and a vertical synchronization (V-sync) signal E70V. Signal E70H is applied to an AFC circuit 70C. Circuit 70C outputs a controlled H-sync signal E70C (FIG. 7b) whose phase and frequency are automatically identified with the center position of H-sync signal E70H. AFC circuit 70C is effective for avoiding influence of noises or ghost components involved in video input Ei. Signal E70C is applied to a D-input of a D type flip-flop (FF) 70D. An output E70D of FF 70D is applied to a D-input of a D-FF 70E. FF's 70D and 70E are clocked by pulse CP10 obtained from generator 70A. An output E70E of FF 70E is applied to an inverted input of an AND gate 70F. Gate 70F receives at its other input the output E70D. An output E70F (FIG. 7c) of gate 70F is applied to an input of an AND gate 70G. Gate 70G outputs a preset signal E70G (FIG. 7e).

The signal E70G is applied to a preset input of a H-counter 70H. Counter 70H may be formed of a 9-stage binary counter (modulo 341/342) having 9 bits outputs Q0–Q8 and a 2-stage binary counter (modulo 4) having 2 bits outputs QA and QB. The 9-stage counter counts the pulse CP10, and the 2-stage counter counts a carry out of the 9-stage counter. Count outputs Q0–Q8 and QA of H-counter 70H are applied to a H-gate 70I. Gate 70I provides a H masking pulse E70I (15.7 kHz) (FIG. 7d) and a signal 2HD (31.5 kHz). Masking pulse E70I is fed back to an inverted input of gate 70G. Where output E70F appears at the time when pulse E70I disappears (FIGS. 7c and 7d; left side), then H-counter 70H is preset by signal E70G corresponding to output E70F (FIGS. 7c and 7e). In other words, H-counter 70H is locked by output E70F. Signal E70G presets the 9-stage counter to, e.g. "72" and QA="0" (FIGS. 7f and 7h), and the 9-stage counter whose modulo is "341" counts the preset data "72" down to "0" by pulse CP10 (FIG. 7k). The modulo "341" counter is obtained when data "340" is preset, since the counter counts "340" down to "0" by 341 pulses of CP10. The 9-stage counter is changed from modulo "341" to modulo "342" when the 2-stage counter counts "4" which corresponds to QA=QB=logical "1" (FIGS. 7f and 7g). That is, the 9-stage counter is generally modulo "341" counter and is once changed to modulo "342" counter after three times count-downs of modulo "341" (FIG. 7h). Thus, the 9-stage counter counts 1,365 (=341×3+342) pulses during a double horizontal scanning period 2H. Accordingly, H-counter 70H functions as a modulo "682.5 (=1,365/2)" counter for one horizontal scanning period 1H. When outputs E70F and E70I appear simultaneously (FIGS. 7c and 7d; right side), gate 70G stops output E70F, i.e. the logical "1" of pulse E70I masks the output E70F. In this case, H-counter 70H continues the count down of modulo "682.5" independent of the output E70F. Practically, 2 μs is sufficient for the pulse width of pulse E70I for assuring said masking.

Charges stored in capacitors C1+− to C128+− (FIG. 2) are refreshed every horizontal scanning. To avoid picture noises due to such refreshment, the refreshing operation is carried out during the horizontal blanking period (FIGS. 7a and 7i). For this purpose, the present data of H-counter of 70H preset by signal E70G is selected to, e.g. "72" so that the count end (count zero point) of H-counter 70H is substantially identical with the trailing edge (P2) of the back porch of video input Ei (FIGS. 7a, 7e and 7h). The refresh start pulse RP10F applied to SR 10F of FIG. 2 is generated at the leading edge (P1) of the horizontal blanking period (FIGS. 7a, 7i and 7j). More specifically, pulse RP10F is generated at which the contents of H-counter 70H is "128" (FIGS. 7h, 7i and 7j).

The V-sync signal E70V is applied to a D-input of a D-FF 70K. An output E70K of FF 70K is applied to a D-input of a D-FF 70L. FF's 70K and 70L are clocked by the signal 2HD obtained from H-gate 70I. An output E70L of FF 70L is applied to an inverted input of an AND gate 70M. Gate 70M receives at its other input the output E70K. An output E70M of gate 70M is applied to an input of an AND gate 70N. Gate 70N outputs a reset signal E70N. Signal E70N is applied to a reset input of a V-counter 70P. Counter 70P may be formed of a 10-stage binary counter (modulo 525) having a conventional configuration. Signal E70N resets counter 70P to "0". Counter 70P counts signal 2HD (31.5 kHz). Count outputs Y0–Y9 of V-counter 70P and count outputs Q0–Q8 of H-counter 70H are applied to a V-gate 70Q. Gate 70Q supplies an inverted input of the gate 70N with a V masking pulse E70Q (59.9 Hz=31.5 kHz/525). Where output E70M appears at the time when pulse E70Q is logical "0", then counter 70P is reset to "0" by output E70M. The V masking pulse E70Q has the same function as said H masking pulse E70i, i.e. the logical "1" of pulse E70Q masks output E70M.

Details as to said masking are discussed in Japanese Patent Application No. 55-58394 titled SYNCHRONIZING CIRCUIT filed by the same assignee (TOSHIBA CO.) as the present application. This Japanese application corresponds to the Public Patent Disclosure No. 56-154879 of Nov. 30, 1981. The disclosure of this Japanese Patent Application is combined herewith. When outputs E70M and E70Q appear simultaneously, V-counter 70P of modulo "525" free runs independent of output E70M.

The H-gate 70I generates pulses CP14B, CP24B, CP24C, CP36A, CP32, CP62, RP10F, 2HD, CP64 and E70I. The V-gate 70Q generates pulses $\overline{WE}$, SP24, GP70, GP24, GP62, CP12J, CP34 and E70Q.

Figure 6B:
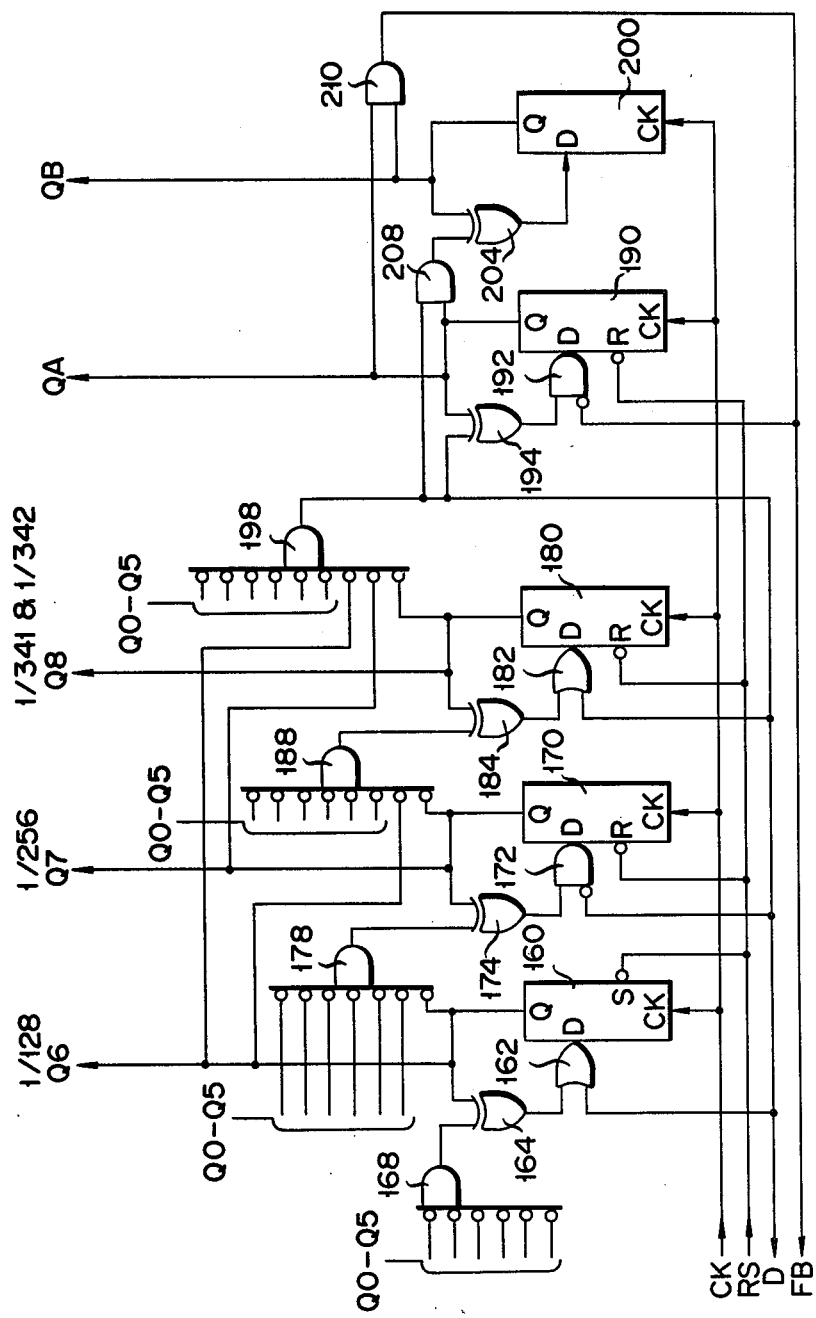

FIGS. 6A and 6B show one embodiment of H-counter 70H shown in FIG. 5. FIG. 8 shows the output waveforms of H-counter 70H.

Figure 8A:
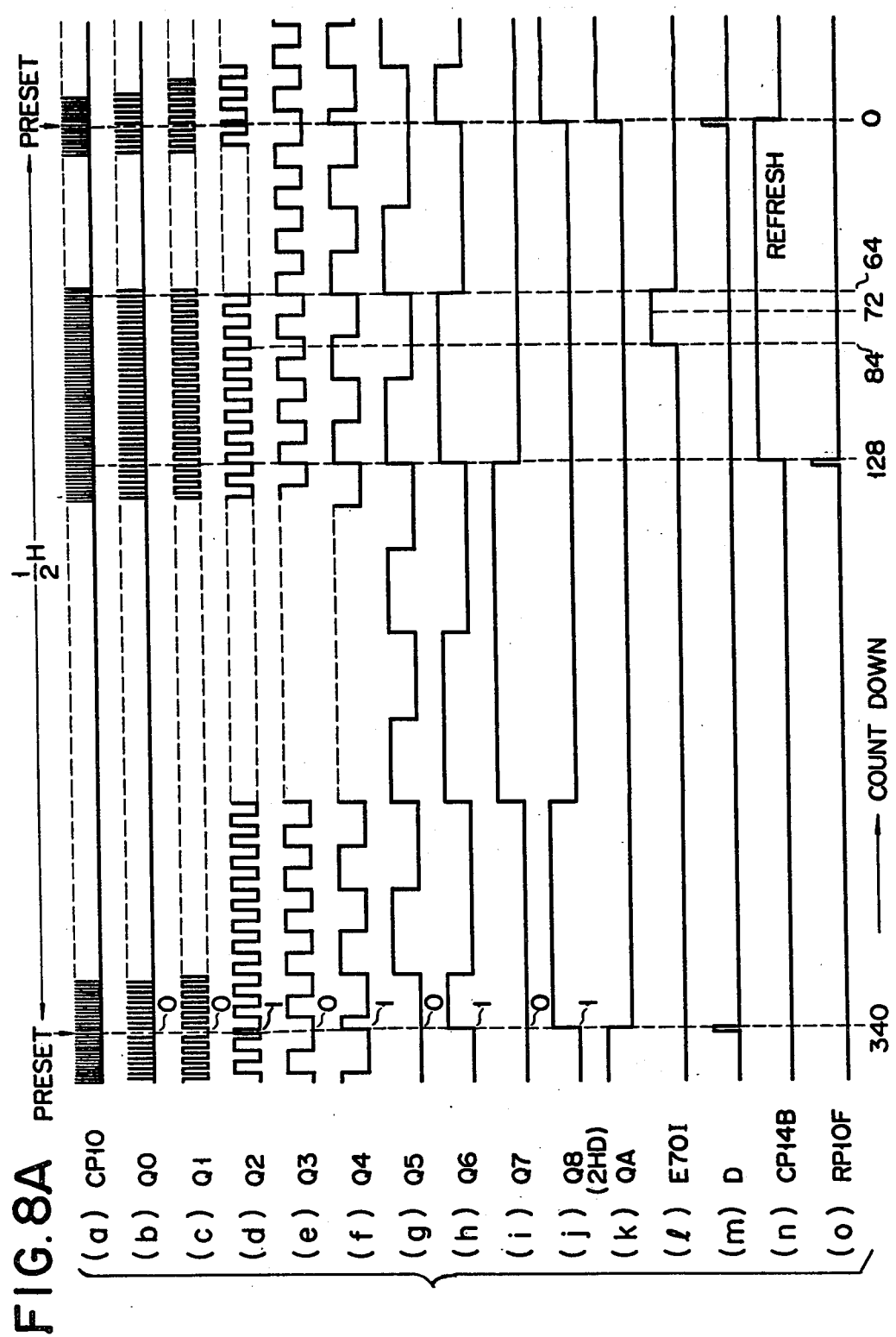
Figure 8B:
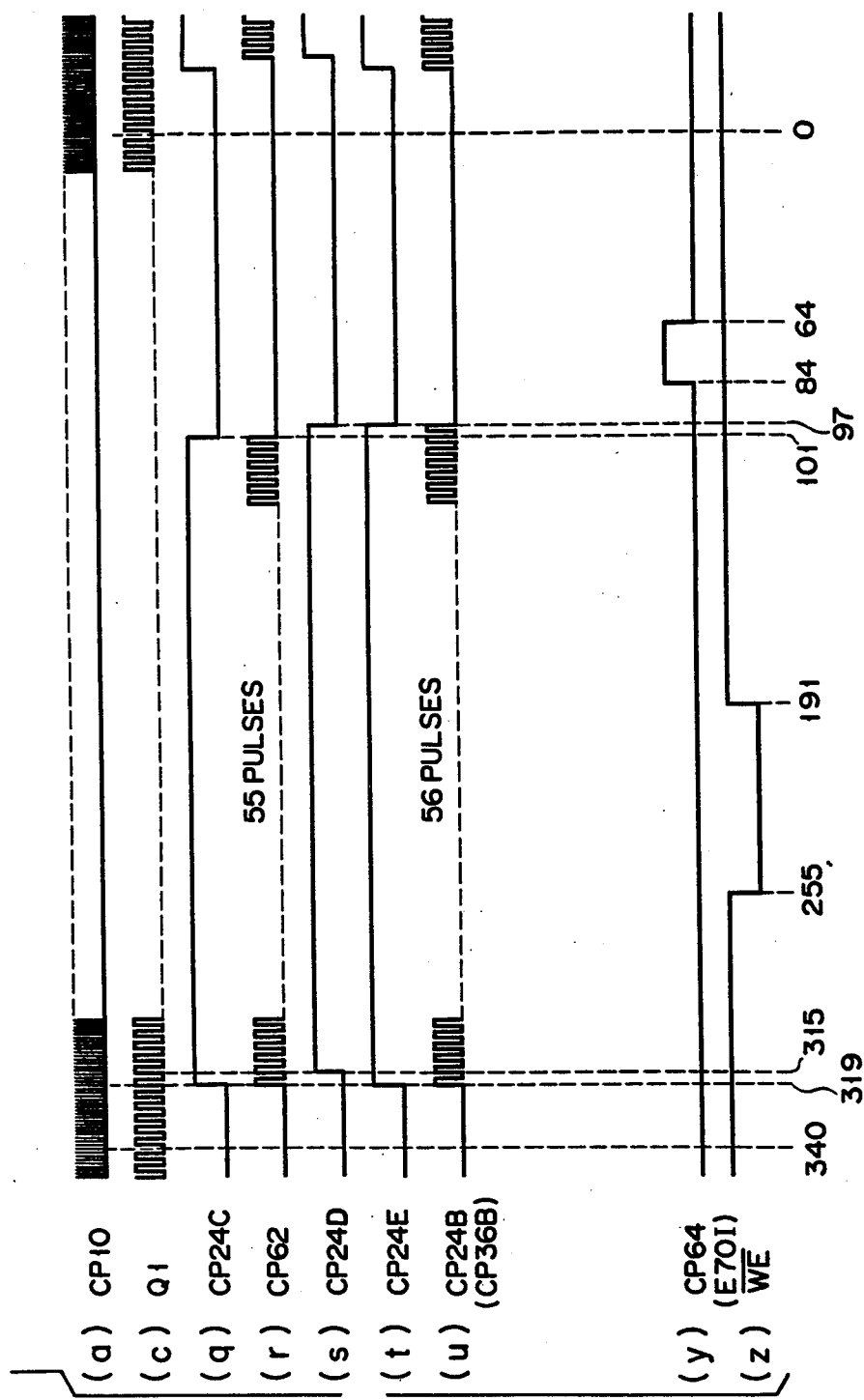

In FIG. 6A the system clock pulse CP10 (10.7 MHz) (FIG. 8a) is applied to each clock input CK of D type FF's 100–200. The preset signal E70G is applied to each reset input R of FF's 100, 110, 120, 140, 150, 170, 180 and 190. Signal E70G is also applied to each set input S of FF's 130 and 160. When E70G="1", FF's 100–180 are so preset that outputs Q0–Q8 of these FF's are (000100100) corresponding to decimal 72. A D-input of FF 100 is connected to an output of an OR gate 102. One input of gate 102 is connected to an output of an EX OR gate 104. One input of gate 104 receives a logical "1" signal, and the other input thereof receives an output Q0 (5.35 MHz) of FF 100 (FIG. 8b). The other input of gate 102 is connected to an output of an AND gate 106. Respective two inputs of gate 106 receive a feed back signal FB and a data signal D (FIG. 8m).

The output Q0 is applied via an inverter 118 to one input of an EX OR gate 114. The other input of gate 114 receives an output Q1 (2.68 MHz) (FIG. 8c) of FF 110. An output of gate 114 is connected to an input of an AND gate 112. An inverted input of gate 112 receives the signal D. An output of gate 112 is connected to a D-input of FF 110.

The outputs Q0 and Q1 are respectively applied to two inverted inputs of an AND gate 128. An output of gate 128 is connected to one input of an EX OR gate 124. The other input of gate 124 receives an output Q2 (1.34 MHz) (FIG. 8d) of FF 120. Output Q2 may be used as the inverting clock pulse CP54 (FIG. 8v). An output of gate 124 is connected to one input of an OR gate 122. The other input of gate 122 receives the signal D. An output of gate 122 is connected to a D-input of FF 120.

The outputs Q0–Q2 are respectively applied to three inverted inputs of an AND gate 138. An output of gate 138 is connected to one input of an EX OR gate 134. The other input of gate 134 receives an output Q3 of FF 130 (FIG. 8e). An output of gate 134 as well as the signal D are coupled via an OR gate 132 to a D-input of FF 130.

The outputs Q0–Q3 are applied to one input of an EX OR gate 144 via four inverted inputs of an AND gate 148. The other input of gate 144 receives an output Q4 of FF 140 (FIG. 8f). An output of gate 144 and the signal D are coupled via an OR gate 142 to a D-input of FF 140.

The outputs Q0–Q4 are applied via five inverted inputs of an AND gate 158 to one input of an EX OR gate 154. The other input of gate 154 receives an output Q5 of FF 150 (FIG. 8g), and an output of gate 154 is connected to an input of an AND gate 152. An inverted input of gate 152 receives the signal D, and an output of gate 152 is connected to a D-input of FF 150.

In FIG. 6B, the outputs Q0–Q5 are applied via six inverted inputs of an AND gate 168 to one input of an EX OR gate 164. The other input of gate 164 receives an output Q6 of FF 160 (FIG. 8h) whose D-input receives via an OR gate 162 an output of gate 164 as well as the signal D.

The outputs Q0–Q6 are applied via seven inverted inputs of an AND gate 178 to one input of an EX OR gate 174. Gate 174 receives at the other input an output Q7 of FF 170 (FIG. 8i). An output of gate 174 is coupled via an AND gate 172 to a D-input of FF 170. An inverted input of gate 172 receives the signal D.

The outputs Q0–Q7 are applied to eight inverted inputs of an AND gate 188 whose output is coupled to a D-input of FF 180 via an EX OR gate 184 and an OR gate 182. Gate 184 receives an output Q8 (31.5 kHz) of FF 180 (FIG. 8j), and gate 182 receives the signal D. The output Q8 may be used as said signal 2HD.

FF's 100–180 jointly constitute a 9-stage binary counter of modulo "341" or "342".

The outputs Q0–Q8 of the 9-stage counter are respectively applied to nine inverted inputs of an AND gate 198. Gate 198 outputs the data signal D. Signal D presets FF's 100–180 so that Q0–Q8 are (001010101) corresponding to decimal 340. Signal D is applied to one input of an EX OR gate 194. The other input of gate 194 receives an output QA of FF 190 (FIG. 8k). An output of gate 194 is coupled to an input of an AND gate 192. An inverted input of gate 192 receives the feed back signal FB. An output of gate 192 is connected to D-input of FF 190.

The data signal D and the output QA are respectively applied to two inputs of an AND gate 208. An output of gate 208 is connected to one input of an EX OR gate 204. The other input of gate 204 receives an output QB of FF 200, and an output of gate 204 is connected to a D-input of FF 200. The outputs QA and QB are respectively applied to two inputs of an AND gate 210. Gate 210 provides the feed back signal FB. Where the signal D is "1" and the outputs QA and QB are not all "1", then the preset data (Q0, Q1, Q2, ..., Q8) for H-counter 70H become (001010101) or modulo "341". When the signal D as well as the outputs QA and QB are all "1", i.e. the 2-stage counter counts four, the preset data are changed from (001010101) to (101010101) or to modulo "342" by the logical "1" of feed back signal FB and data signal D.

FF's 190 and 200 form a 2-stage binary counter of modulo "4". The feed back signal FB derived from the 2-stage counter changes the modulo "341" of the 9-stage counter to modulo "342". Such modulo change is necessary for identifying the counting period of H-counter 70H with the H-sync signal period of video input Ei.

FIG. 6C is an embodiment of a gate circuit for generating the pulses CP24A, CP32 and CP36A.

The sign signal E24 derived from the third shift register (SR) 24J shown in FIG. 3 is applied to a reset input R of a flip-flop (FF) 70T. FF 70T receives at its set input S the start pulse SP24. An output E70T of FF 70T is applied to one input of an AND gate 70V. The other input of gate 70V receives the pulse CP10. Gate 70V outputs the loading pulse CP24A only when FF 70T is set.

The shift pulse E24C derived from the first SR 24C (FIG. 3) is applied to a reset input R of an FF 70U. A set input S of FF 70U receives the start pulse SP24. An output E70U of FF 70U is applied to a first input of AND gate 70W. A second input of gate 70W receives pulse CP10. A third input of gate 70W receives a gate pulse GP70 which is logical "1" only when the count of V-counter 70P is, e.g. "518". Gate 70W provides the pulses CP32 and CP36A when pulses GP70 and E70U are both logical "1".

Figure 6D:
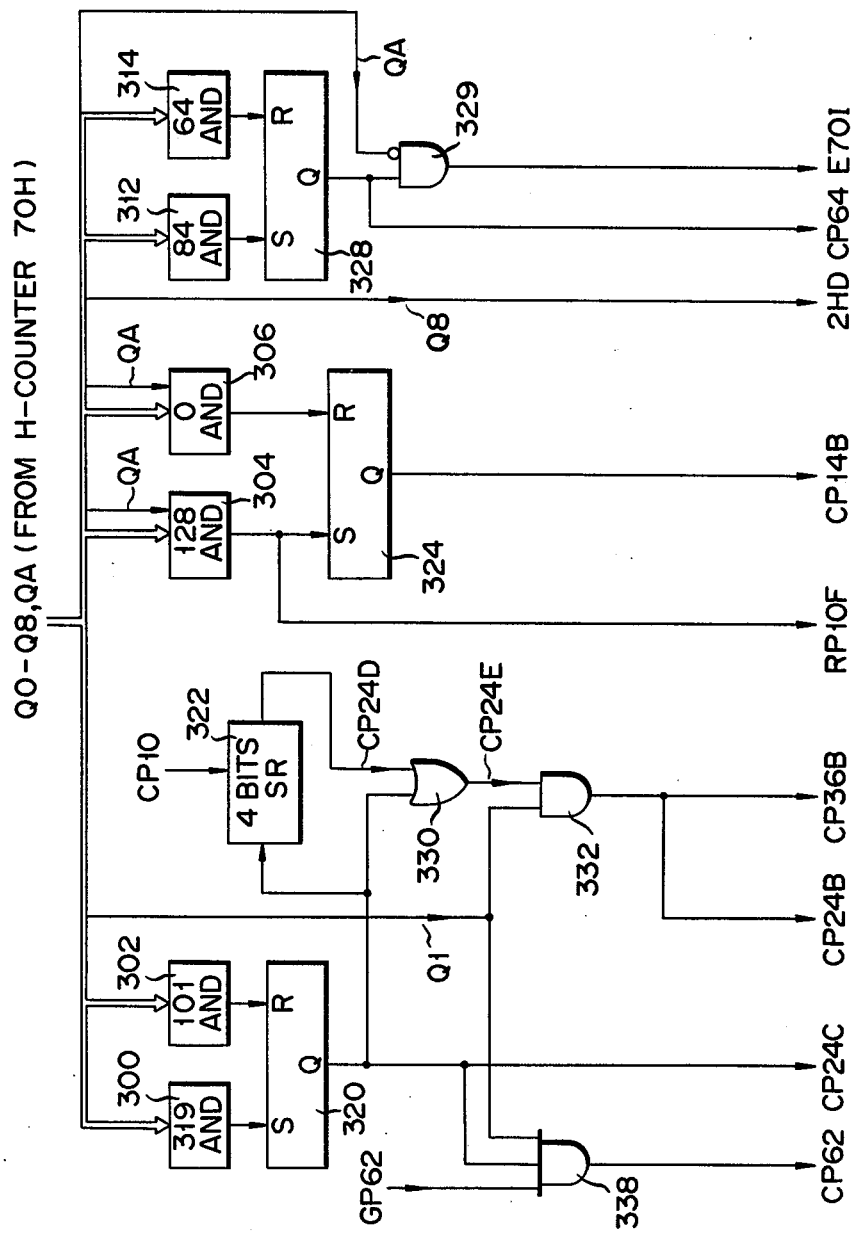
FIG. 6D is one embodiment of an H-gate 70I shown in FIG. 5.

FIG. 6D is one embodiment of the H-gate 70I shown in FIG. 5. FIG. 8 is a timing chart illustrating the operation of H-gate 70I.

The count outputs Q0–Q8 and QA of the H-counter 70H (FIG. 5) are applied to AND gates 300 to 314. Each of these gates has 10 inputs. Gate 300 detects the binary (111 111 001) or decimal "319" of outputs Q0–Q8. That is, gate 300 provides an ANDed output having logical "1" only when the outputs Q0–Q8 correspond to decimal "319". Similarly, gates 302–314 detect decimal "101", "128" (QA="0"), "0" (QA="0"), "84" and "64". When outputs Q0–Q8 correspond to "319", gate 300 sets a flip-flop (FF) 320. During the set mode, FF 320 outputs the pulse CP24C (FIG. 8q) which is applied to the buffer 24 (FIG. 1). When outputs Q0–Q8 correspond to "101", gate 302 resets FF 320 so that pulse CP24C disappears. Pulse CP24C is inputted to a 4-bit shift register (SR) 322. SR 322 is clocked by the pulse CP10 and delays the inputted pulse by 4 pulses of CP10. Then, SR 322 outputs a pulse CP24D (FIG. 8s).

The pulses CP24C and CP24D are applied to an OR gate 330. Gate 330 outputs a pulse CP24E (FIG. 8t). Pulse CP24E is applied to one input of an AND gate 332. Gate 332 receives at the other input the output Q1 of H-counter 70H (FIG. 8c). Gate 332 outputs the pulses CP24B and CP36B during which pulse CP24E is logical "1" (FIGS. 8t and 8u). The output Q1 and pulse CP24C are applied to an AND gate 338. Gate 338 receives the pulse GP62 obtained from V-gate 70Q (FIG. 5). Gate 338 outputs the correlation control signal CP62 (FIG. 8r).

When the outputs Q0–Q8 correspond to "128" and QA="0", the gate 304 provides the refresh start pulse RP10F (FIG. 8o). Pulse RP10F sets an FF 324. FF 324 is reset by the output of gate 306 at the time when outputs Q0–Q8 correspond to "0" and QA="0". During the set mode, FF 324 outputs the address change gate pulse CP14B (FIG. 8n). Pulse CP14B is logical 37 1" only when QA="0" and the outputs Q0–Q8 fall within "127" to "0" during which the refreshment for the capacitors C1+ − to C128+ − (FIG. 2) is carried out. The output Q8 of H-counter 70H may be used as the signal 2HD (FIG. 8j). When outputs Q0–Q8 correspond to "84", an FF 328 is set by gate 312. When outputs Q0–Q8 correspond to "64", FF 328 is reset by gate 314. Where outputs Q0–Q8 fall within "84" to "64", then FF 328 outputs the latch pulse CP64 (FIG. 8y). Latch pulse CP64 is applied to an AND gate 329. An inverted input of gate 329 receives output Qa, and gate 329 provides the masking pulse E70I (FIG. 8l).

Figure 6E:
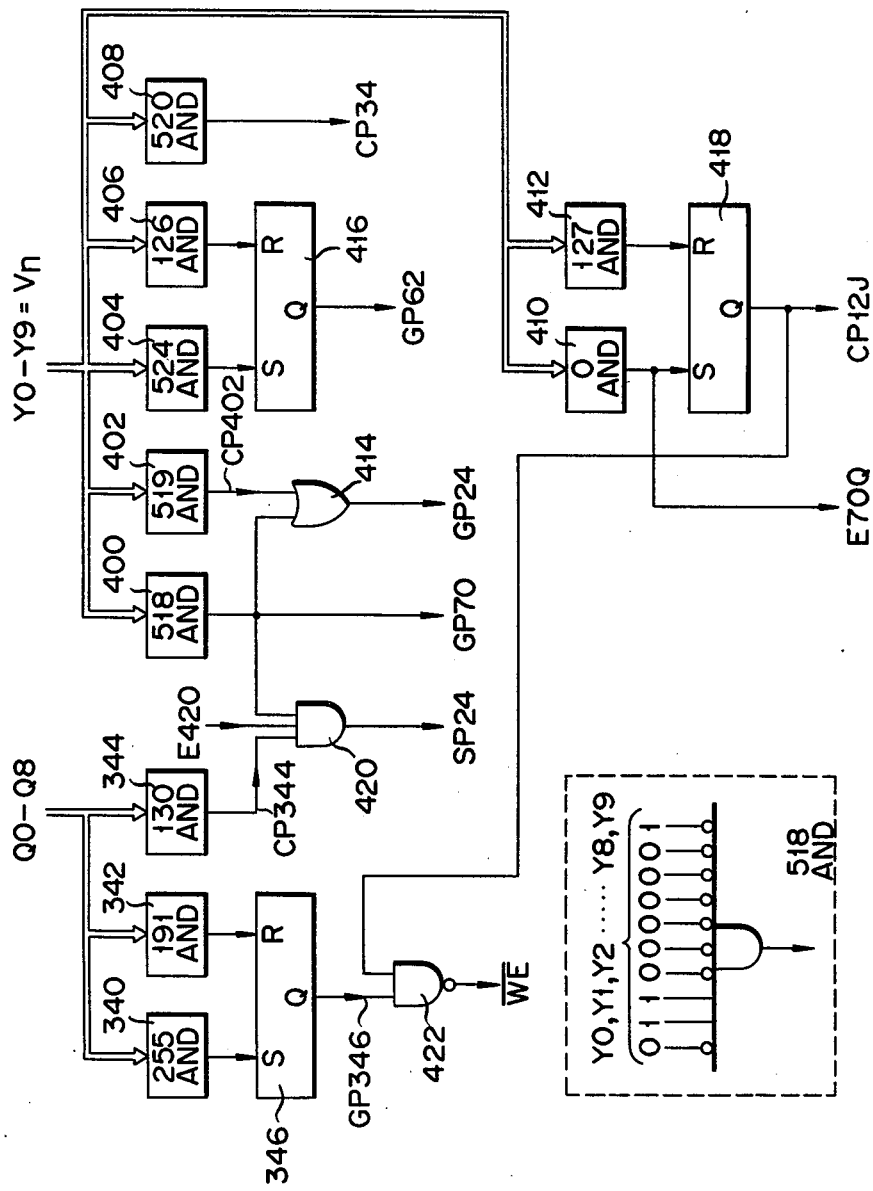
FIG. 6E is one embodiment of a V-gate 70Q shown in FIG. 5.
Figure 9:
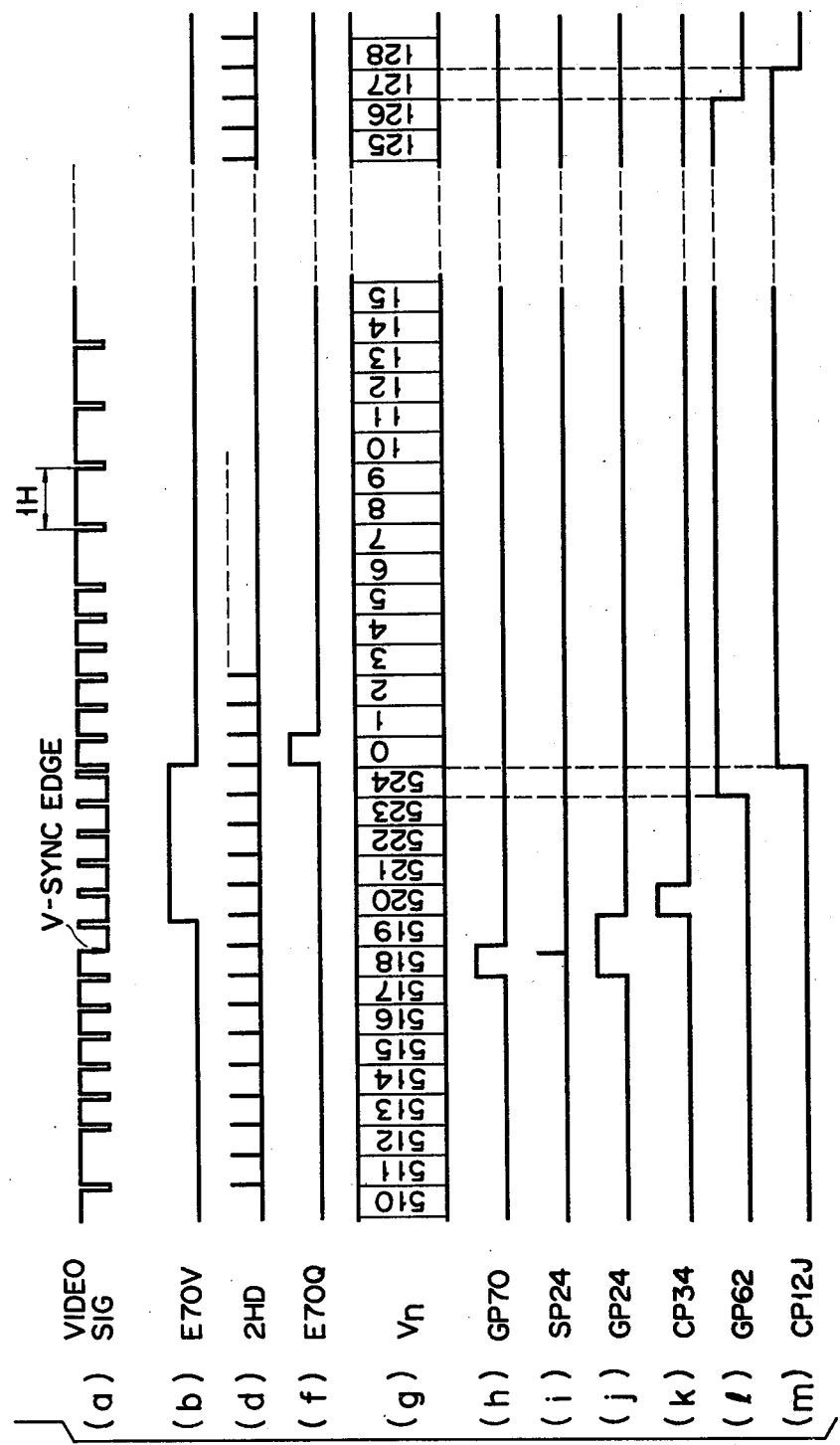
FIGS. 9 and 10 are timing charts illustrating the operation of the V-counter 70P and V-gate 70Q.
Figure 10:
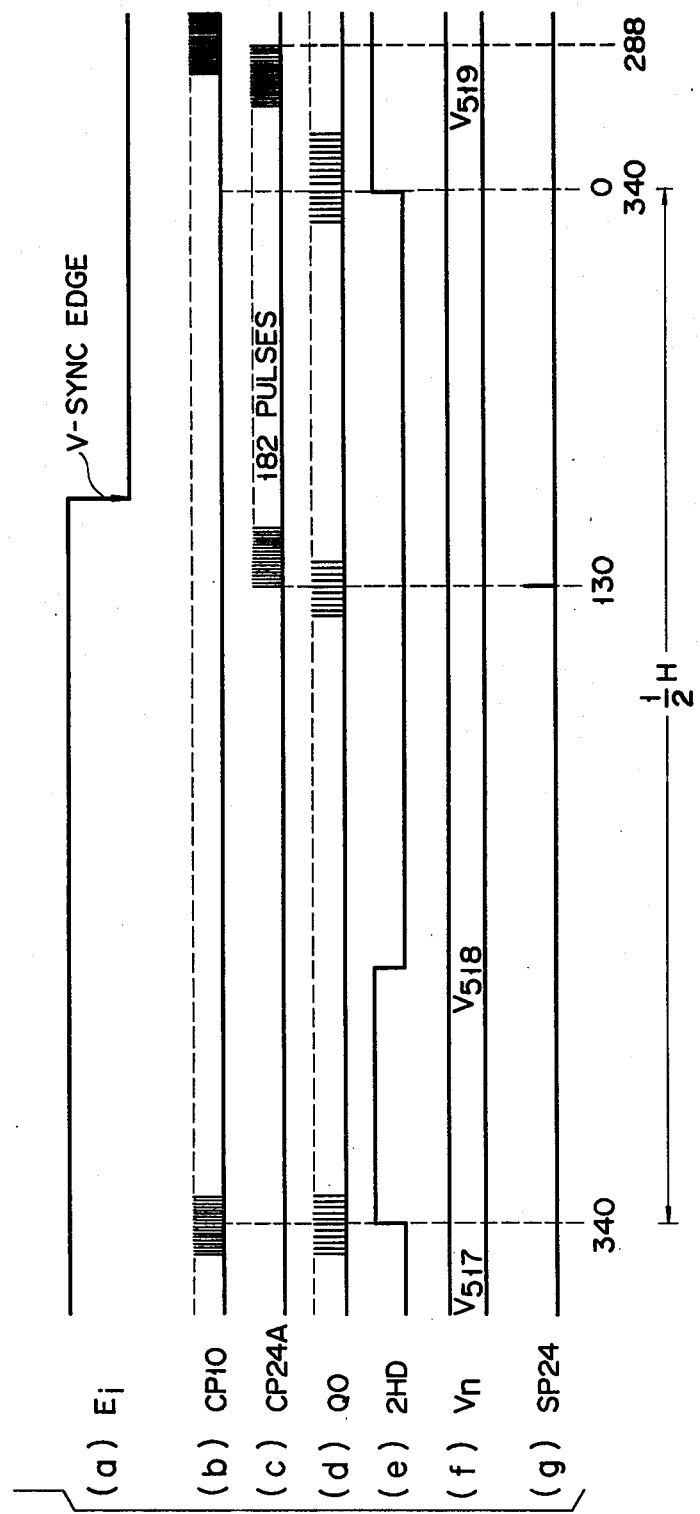

FIG. 6E is one embodiment of the V-gate 70Q shown in FIG. 5. FIGS. 9 and 10 are timing charts illustrating the operation of V-gate 70Q and V-counter 70P.

The count outputs Q0–Q8 of H-counter 70H are applied to 9-input AND gates 340–344. Gate 340 sets a flip-flop (FF) 346 when outputs Q0–Q8 correspond to decimal "255". When outputs Q0–Q8 correspond to "191", gate 342 resets FF 346. FF 346 outputs a gate pulse GP346 during which outputs Q0–Q8 fall within "255" to "191". Gate 344 outputs a pulse CP344 when outputs Q0–Q8 correspond to "130".

The count outputs Y0–Y9 of V-counter 70P or a 10-bit V count data $V_n$ is applied to 10-input AND gates 400–412. When data $V_n$ is "518", gate 400 outputs the gate pulse GP70 (FIGS. 9g and 9h). Pulse GP70 is applied to gate 70W of FIG. 6C. The pulses GP70 and CP344 are applied to an AND gate 420. Gate 420 receives a signal E420 which is temporarily logical "1" at the time when the channel of TV set is changed or when the power thereof is ON. Gate 420 outputs the start pulse SP24 when E420="1", Q0–Q8="130" (FIG. 10g) and $V_n$="518" (FIG. 9i). When $V_n$="519", gate 402 outputs a pulse CP402. Pulses GP70 and CP402 are applied to an OR gate 414. Gate 414 outputs the gate pulse GP24 (FIG. 9j). When $V_n$="524", gate 404 sets an FF 416. When $V_n$="126", gate 406 resets FF 416. During the set mode, FF 416 outputs the gate pulse GP62 (FIG. 9l) which is applied to the gate 338 (FIG. 6D). When $V_n$="520", gate 408 outputs the enabling pulse CP34 (FIG. 9k). At this time, the adder 34 of FIG. 1 carries out the addition of +1 or −1. Except $V_n$="520", no addition is made in adder 34. When $V_n$="0", gate 410 outputs the masking pulse E70Q. An FF 418 is set by pulse E70Q. FF 418 is reset by gate 412 when $V_n$="127". During the set mode, FF 418 outputs the loading pulse CP12J (FIG. 9m) which is used as a gate signal for pulse WE and is applied to the latch 12J (FIG. 2B).

The pulses CP12J is applied to one input of a NAND gate 422. The other input of gate 422 receives the gate pulse GP346. Gate 422 outputs the write enable pulse $\overline{WE}$ only when outputs Q0–Q8 fall within "255" to "191" (FIG. 8z) and $V_n$ falls within "0" to "127" (FIGS. 9g and 9m).

The summarized operational sequence of FIG. 1 apparatus according to the count of V-counter 70P will be as follows.

The data loading or storing for the buffers 24, 32 and 42 are completed when $V_n = V_{518}$ and $V_{519}$ (FIG. 9j). The addition of +1 or −1 is carried out in adder 34 only when $V_n = V_{520}$ (FIG. 9k). The correlation operation for obtaining the data $d_1$ to $d_{128}$ is carried out when $V_n = V_{524}$ to $V_{126}$ (FIG. 9l). In the present embodiment, $d_1$ is obtained when $V_n = V_{524}$, and $d_{128}$ is obtained when $V_n = V_{126}$. The correction of each tap coefficient is carried out during $V_n = V_0$ to $V_{127}$ (FIG. 9m). Thus, where $V_n = V_0$, then the first tap coefficient data stored in 0th address of TCM 14A (FIG. 2B) is renewed by the data $d_1$ which has been obtained at $V_{524}$. Similarly, where $V_n = V_{127}$, then the 128th tap coefficient data in 127th address of TCM 14A is renewed by the data $d_{128}$ obtained at $V_{126}$. The write enabling signal $\overline{WE}$ is generated only during $V_n = V_0$ to $V_{127}$.

The whole circuit operation of the ghost canceller shown chiefly in FIG. 1 will be as follows.

The start timing of pulses CP24A and CP36A (FIGS. 11b and 11c) should exactly be fixed. This requirement is satisfied by the start pulse SP24 with the circuit of FIG. 6C. The pulse SP24 is generated at the time when the count $V_n$ of V-counter 70P is "518" and the counter Q0–Q8 of H-counter 70H is "130" (FIG. 10g). Pulse SP24 is inputted via OR gate 24B to 57 bits SR 24C (FIG. 3). SR's 24C, 24F and 24J form 182 bits shift register. Only when the pulses GP24 and SP24 appear (FIGS. 9i and 9j), SR's 24C, 24F and 24J store by 182 pulses of CP24A the V-sync edge portion contained in video output Eo (FIGS. 10a, 10c, 11a, 11b and 11e). SR's 24C and 24F store data corresponding to parameter "k" of sign signal $y_{i+k}$ while SR 24J stores and circulates the data corresponding to parameter "i+k" of signal $y_{i+k}$. Buffer 32 stores the amplitude information of video output Eo by pulse CP32 only when the FF 70U (FIG. 6C) is set and the gate pulse GP70 appears at $V_n$="518" (FIGS. 9g and 9h). FF 70U is reset by pulse E24C derived from the first SR 24C (FIG. 3). Here, pulse CP32 is used as pulse CP36A. Thus, buffer 32 stores the amplitude information around said V-sync edge portion of output Eo by means of 56 pulses of CP36A (FIGS. 11a and 11c).

Once the SR's 24C, 24F and 24J complete their data storage, the gate pulse GP24 disappears, and the contents of SR's 24C, 24F and 24J are determined. Similarly, once the wave memory 36 completes its data storage, the gate pulse GP70 disappears and the contents of memory 36 are determined. After completion of data storage for SR's 24C, 24F, 24J and memory 36, then the sign signal E24 is read out of SR 24J by means of pulse CP24B (FIG. 11b), and the wave signal D36 is read out of memory 36 by pulse CP36B (FIG. 11c).

Figure 11:
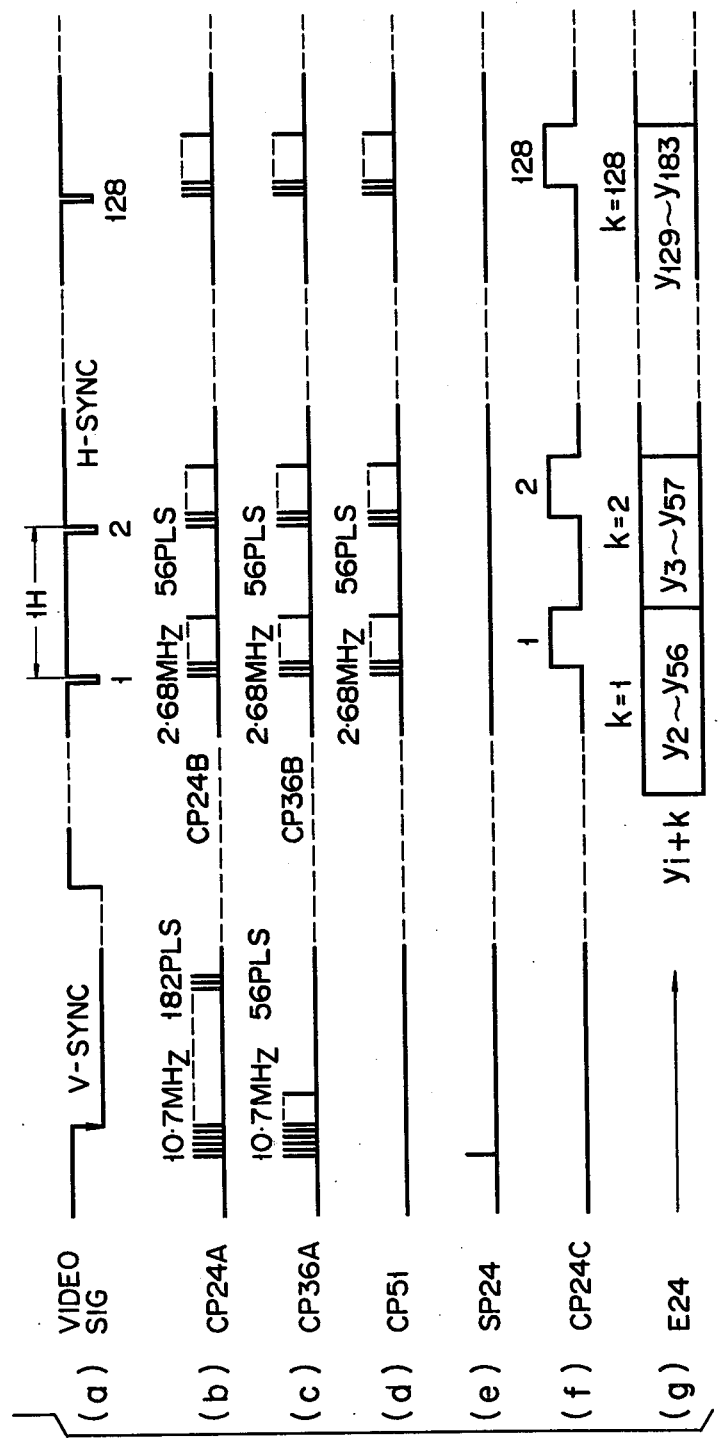
FIG. 11 is a timing chart illustrating the circuit operation of the automatic equalizer shown in FIG. 1.

The parameter "i" of sign signal $y_{i+k}$ (=E24) is changed by the pulse CP24B (FIG. 11b), and the parameter "k" of signal $y_{i+k}$ is changed by the pulse CP24C (FIG. 11f). Thus, the signal E24 is changed from $y_2$ to $y_{56}$ when k=1, from $y_3$ to $y_{57}$ when k=2, and from $y_{127}$ to $y_{183}$ when k=128 (FIG. 11g). Pulse CP24C as well as the pulse blocks of CP24B and CP36B are synchronized with the H-sync or each count of H-counter 70H (FIGS. 11a–11f).

Figure 12:
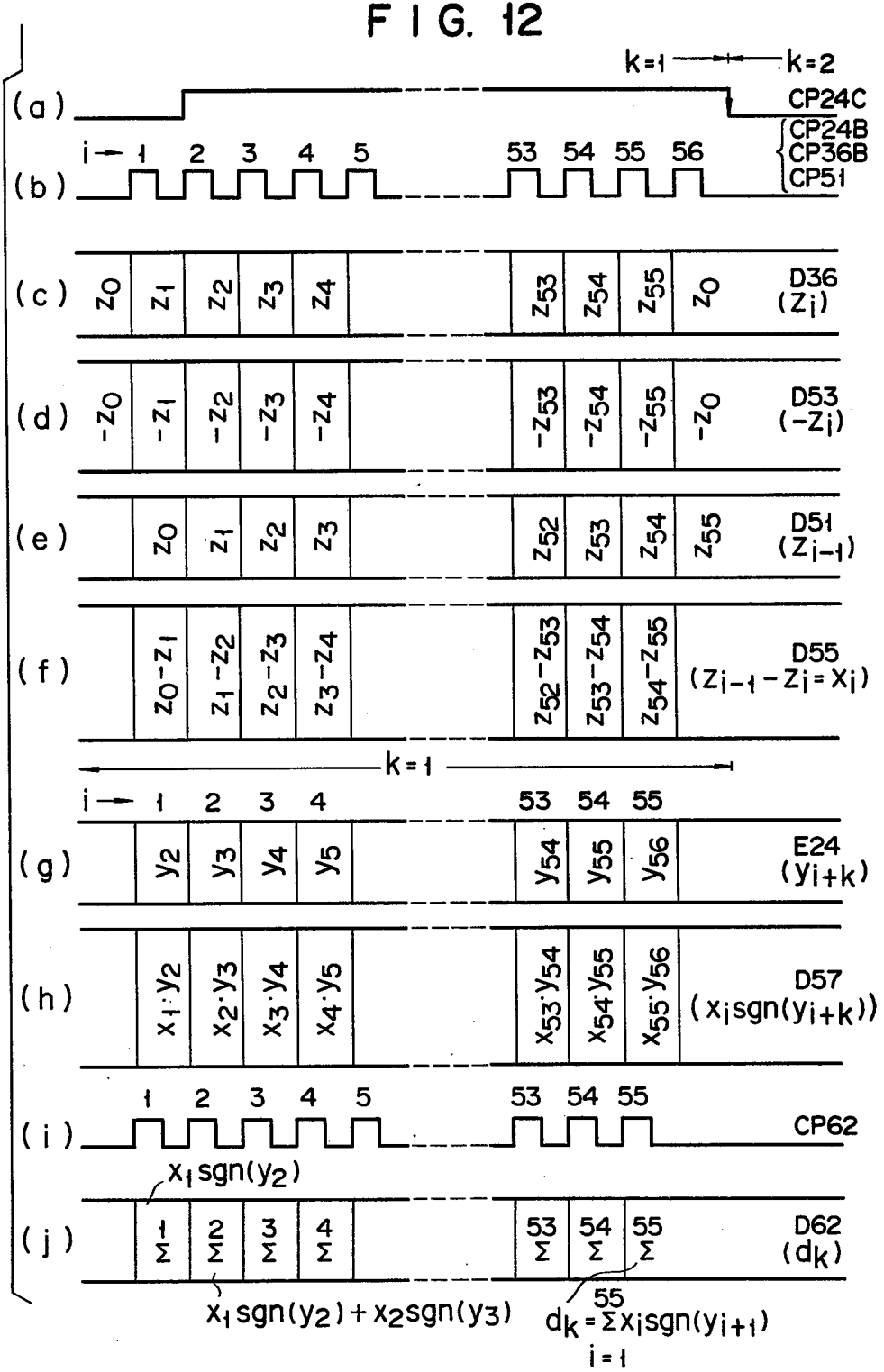
FIG. 12 shows the timing of correlation operation at the condition under k=1.

FIG. 12 shows the timings of correlation operation at the condition under k=1. When the first pulse of CP24B appears (FIG. 12b), since i=1 and k=1, then $y_{i+k}$ is $y_2$ (FIG. 12g), the contents $Z_{i-1}$ of signal D51 is $Z_0$ (FIG. 12e), the contents $-Z_i$ of signal D53 is $-Z_1$ (FIG. 12d) and signal D55($x_i$) is $Z_0 - Z_1$ (FIG. 12f).

In this case, the signal D57 is $x_i \cdot y_2$ (FIG. 12h), and the first pulse CP62 which instructs the accumulation of only $x_1 \cdot sgn(y_2)$ appears (FIG. 12i). Accordingly, $$\sum_{i=1}^{1} x_i \cdot sgn(y_{i+1}) = x_1 \cdot sgn(y_2)$$

from equation (4) (FIG. 12j).

When the second pulse of CP24B appears, the parameter "i" is incremented by "1" which corresponds to the one clocking of SR 24J by pulse CP24B (FIG. 3), i.e. i=2 (FIGS. 12b). In this case, $y_{i+k} = y_3$ and CP36B=CP51="1" (FIGS. 12b and 12h). Since CP36B="1" and CP51="1", the contents $Z_{i-1}$ of signal D51 is changed from $Z_0$ to $Z_1$ and the contents $-Z_i$ of signal D53 is changed from $-Z_1$ to $-Z_2$ (FIGS. 12d and 12e). Since $x_2=Z_1-Z_2$, D57=$x_2 \cdot sgn(y_3)$ (FIG. 12h). At this time, the second pulse of CP62 which instructs the accumulation of $x_1 \cdot sgn(y_2)$ and $x_2 \cdot sgn(y_3)$ appears (FIG. 12i). Then, $$\sum_{i=1}^{2} x_i \cdot sgn(y_{i+1}) = x_i \cdot sgn(y_2) + x_2 \cdot sgn(y_3)$$

(FIG. 12j).

When the third pulse of CP24B appears, the parameter "i" is further incremented by "1", i.e. i=3. In the case, $y_{i+k}=y_4$, CP36B="1" and CP51="1". Since CP36B="1" and CP51="1", the contents $Z_{i-1}$ and the contents $-Z_i$ are changed from $Z_1$ to $Z_2$ and $-Z_2$ to $-Z_3$, respectively. Accordingly, D57=$x_3 \cdot sgn(y_4)$, and $$\sum_{i=1}^{3} x_i \cdot sgn(y_{i+1})$$

is obtained from the accumulation by the third pulse of CP62. Similarly, where the 55th pulse of CP24B appears, i.e. i=55, then $y_{i+k}=y_{56}$. In this case, D57=$x_{55} \cdot sgn(y_{56})$, and $$d_k = d_1 = \sum_{i=1}^{55} x_i \cdot sgn(y_{i+1})$$

is obtained when the 55th pulse of CP62 appears.

The operation for obtaining data $d_k$ (k=1, 2, ..., 128) is the same as that in the case of data $d_1$. Each operation for obtaining one of data $d_k$ is performed during half horizontal scanning period. In the present embodiment, the whole operation for obtaining all data $d_1, d_2, \ldots, d_{128}$ is carried out from $V_n=V_{524}$ to $V_n=V_{126}$ (FIGS. 9g and 9l) and the correction of the tap coefficients of transversal filter 10 is carried out from $V_0$ to $V_{127}$. The write enable signal $\overline{WE}$ (FIG. 8z) is therefore generated only during the period between $V_0$ and $V_{127}$. Thus, whole operation for obtaining all data $d_1, d_2, \ldots, d_{128}$ is performed during one vertical scanning period (1V).

Although specific constructions have been illustrated and described herein, it is not intended that the invention be limited to the elements and constructions disclosed. One skilled in the art will recognize that other particular elements or sub-constructions may be used without departing from the scope and spirit of the invention.

What is claimed is:

1. An automatic equalizer comprising:
    transversal filter means responsive to an input signal and a tap coefficient control signal for equalizing said input signal in accordance with said tap coefficient control signal thereby to provide an equalized output signal, and having an output stage with a delay element through which said equalized output signal passes;
    sign means coupled to said transversal filter means and responsive to a clock signal and said equalized output signal from said delay element for generating from said equalized output signal a sign signal according to said clock signal, said sign signal representing the sign of a rate of change of said equalized output signal and including:
        means coupled to the output of said delay element for differentiating said equalized output signal to provide a differentiated signal which contains time base information as to specific positions of waveform of said equalized output signal and polarity information thereof, said differentiating means including a buffer circuit having an input terminal for receiving said equalized output signal and an output terminal for providing a specific signal corresponding to said equalized output signal, a reflex line coupled to the output terminal of said buffer circuit for absorbing said specific signal, and for feeding the reflected specific signal back to said output terminal with a given delay time which corresponds to the half period of a writing clock, thereby the fed back specific signal being combined with said specific signal at said output terminal, and the circuit impedance of said reflex line being matched with said given output impedance, and means coupled to the output terminal of said buffer circuit, for converting the potential of said specific signal combined with the absorbed, reflected and fed back specific signal of said reflex line into said differentiated signal, and
    read/write means coupled to said differentiating means for writing said differentiated signal therein according to a writing clock, and for reading out written contents thereof as said sign signal according to a reading clock, said writing and reading clocks corresponding to said clock signal;
    wave memory means responsive to a timing signal and said equalized output signal from said delay element for storing amplitude information of said equalized output signal according to said timing signal and providing a differentiated wave signal;
    correlator means coupled to said transversal filter means, said sign means, and said wave memory means and responsive to a correlation control signal, said sign signal and said differentiated wave signal, for correlating said sign signal with said differentiated wave signal according to said correlation control signal and providing said tap coefficient control signal; and
    generator means coupled to said sign means, said wave memory means, and said correlator means for generating said clock signal, said timing signal, and said correlation control signal, the generation timing of these signals being such that the operation of automatic equalization is regulated.

2. An automatic equalizer comprising:
    transversal filter means responsive to an input signal and a tap coefficient control signal for equalizing said input signal in accordance with said tap coefficient control signal thereby to provide an equalized output signal and having an output stage with a delay element through which said equalized output signal passes;
    sign means coupled to said transversal filter means and responsive to a clock signal and said equalized output signal for generating from said equalized output signal a sign signal according to said clock signal, said sign signal representing the sign of a rate of change of said equalized output signal;
    wave memory means responsive to a timing signal and said equalized output signal for storing amplitude information of said equalized output signal according to said timing signal and providing a differentiated wave signal including:

comparator means for comparing said equalized output signal with a reference signal to provide a comparison result;

buffer means coupled to said comparator means, for registering said comparison result and providing the registered contents thereof as an accumulation control signal according to a loading pulse which is synchronized with said timing signal, data change means responsive to a wave signal and coupled to said buffer means, for changing the contents of said wave signal according to said accumulation control signal and providing a changed result;

integration means coupled to said data change means, for integrating said changed result according to said timing signal and providing said wave signal;

converter means coupled to said comparator means and said integration means, for converting said wave signal to said reference signal; and differentiator means coupled to said integration means for differentiating said wave signal to provide said differentiated wave signal;

correlator means coupled to said transversal filter means, said sign means, and said wave memory means and responsive to a correlation control signal, said sign signal and said differentiated wave signal, for correlating said sign signal with said differentiated wave signal according to said correlation control signal and providing said tap coefficient control signal; and generator means coupled to said sign means, said wave memory means, and said correlator means for generating said clock signal, said timing signal, and said correlation control signal, the generation timing of these signals being such that the operation of automatic equalization is regulated.

3. An automatic equalizer of claim 1, wherein said transversal filter means includes:

a transversal filter having a plurality of taps, for weighting said input signal transferred therethrough in accordance with given tap coefficients applied to said taps, said transversal filter supplying said delay element with said equalized output signal which is subjected to said weighting;

memory means coupled to said transversal filter, for storing tap coefficient data designating said given tap coefficients and supplying said tap coefficient data to said transversal filter; and means coupled to said memory means, for changing said tap coefficient data according to said tap coefficient control signal.

4. An automatic equalizer of claim 2, wherein said sign means includes:

means coupled to the output of said delay element for differentiating said equalized output signal to provide a differentiated signal which contains time base information as to specific positions of wave form of said equalized output signal and polarity information thereof; and read/write means coupled to said differentiating means for writing said differentiated signal therein according to a writing clock, and for reading out written contents thereof as said sign signal according to a reading clock, said writing and reading clocks corresponding to said clock signal.

5. An automatic equalizer of claim 4, wherein said differentiating means includes:

a buffer circuit having an input terminal for receiving said equalized output signal and an output terminal for providing a specific signal with a given output impedance, said specific signal corresponding to said equalized output signal;

a reflex line coupled to the output terminal of said buffer circuit, for absorbing said specific signal, and for feeding the reflected specific signal back to said output terminal with a given delay time which corresponds to the half period of said writing clock, thereby the fed back specific signal being combined with said specific signal at said output terminal, and the circuit impedance of said reflex line being matched with said given output impedance; and means coupled to the output terminal of said buffer circuit, for converting the potential of said specific signal combined with the absorbed, reflected and fed back specific signal of said reflex line into said differentiated signal.

6. An automatic equalizer of claim 1, wherein said read/write means includes:

first register means for storing said differentiated signal according to said writing clock and outputting the stored contents thereof according to a first reading clock which corresponds to said reading clock; and second register means coupled to said first register means, for storing said differentiated signal according to said writing clock, for storing the outputted stored contents of said first register means, and outputting said sign signal according to a second reading clock which corresponds to said reading clock, said sign signal being circulated in said second register means according to said second reading clock, and the circulated contents of said second register means being changed by said outputted stored contents of said first register means according to said first reading clock.

7. An automatic equalizer comprising:

transversal filter means connected to receive an input signal to be equalized, having an output terminal for providing an equalized output signal and having a plurality of weight control taps responsive to a tap coefficient control signal, for equalizing said input signal in accordance with said tap coefficient control signal to provide said equalized output signal, said equalized output signal including periodic reference information contained in said input signal;

first memory means coupled to the output terminal of said transversal filter means and being responsive to a first timing signal for storing first wave information of said equalized output signal in accordance with said reference information and first timing signal;

second memory means coupled to the output terminal of said transversal filter means and being responsive to a second timing signal for storing second wave information of said equalized output signal in accordance with said second timing signal;

correlator means coupled to said transversal filter means and being responsive to a correlation control signal, for correlating said first wave information from said first memory means with said second wave information from said second memory means in response to said correlation control signal, and providing said tap coefficient control signal; and means coupled to said first memory means, second memory means and correlator means, for generating said first timing signal, second timing signal and correlation control signal according to information (V/H SYNC) contained in said intput signal.

8. An automatic equalizer of claim 2, wherein said differentiator means includes:
 latch means responsive to a latching pulse and coupled to said integration means, for memorizing said wave signal to provide a latched signal containing a fragmentary component of said wave signal, said fragmentary component being renewed by said latching pulse in accordance with a subsequent fragmentary component of said wave signal which is obtained from said integration means according to said timing signal, said latching pulse being in synchronizm with said timing signal;
 inverter means coupled to said integration means for inverting said wave signal containing the subsequent fragmentary component to provide an inverted signal containing the phase-inverted component of said subsequent fragmentary component; and
 adder means coupled to said latch means and said inverter means for adding said inverted signal to said latched signal to provide said differentiated wave signal.

9. An automatic equalizer adapted to a ghost canceller of a color TV receiver comprising:
 transversal filter means responsive to an input signal containing signal components of a color subcarrier, a horizontal synchronization and a vertical synchronization and a tap coefficient control signal for equalizing said input signal in accordance with said tap coefficient control signal thereby to provide an equalized output signal and having an output stage with a delay element through which said equalized output signal passes;
 sign means coupled to said transversal filter means and responsive to a clock signal and said equalized output signal for generating from said equalized output signal a sign signal according to said clock signal, said sign signal representing the sign of a rate of change of said equalized output signal;
 wave memory means responsive to a timing signal and said equalized output signal for storing amplitude information of said equalized output signal according to said timing signal and providing a differentiated wave signal;
 correlator means coupled to said transversal filter means, said sign means, and said wave memory means and responsive to a correlation control signal, said sign signal and said differentiated wave signal, for correlating said sign signal with said differentiated wave signal according to said correlation control signal and providing said tap coefficient control signal; and
 generator means coupled to said sign means, said wave memory means, and said correlator means for generating said clock signal, said timing signal, and said correlation control signal, the generation timing of these signals being such that the operation of automatic equalization is regulated, including:
 a system clock generator responsive to the color subcarrier component of said input signal, for generating a system clock pulse;
 a sync signal separator for separating from said input signal a H-sync signal of said horizontal synchronization and a V-sync signal of said vertical synchronization; and
 counter gate means coupled to said system clock generator and said sync signal separator, for generating said clock signal, said timing signal and said correlation control signal from said system clock pulse, H-sync signal and V-sync signal.

10. An automatic equalizer of any one of claims 1, 2 or 9, wherein said correlator means includes:
 process means coupled to said sign means and said wave memory means, for multiplying said differentiated wave signal by said sign signal to provide a multiplied result; and
 accumulation means responsive to said correlation control signal and coupled to said process means for accumulating said multiplied result according to said correlation control signal to provide said tap coefficient control signal which contains polarity information of an accumulated result of said multiplied result.

11. An automatic equalizer of claim 10, wherein said process means includes an exclusive OR gate which receives said differentiated wave signal and said sign signal and outputs said multiplied result.

12. An automatic equalizer of claim 10, wherein said accumulation means includes:
 means coupled to said process means, for combining said multiplied result with said accumulated result to form a combined result;
 means responsive to said correlation control signal and coupled to said combining means, for storing said combined result and outputting said accumulated result according to said correlation control signal; and
 means coupled to said storing means, for discriminating the polarity or sign of said accumulated result to generate said tap coefficient control signal whose polarity corresponds to the polarity of said accumulated result.

13. An automatic equalizer of claim 7, wherein said input signal includes a TV video signal containing a signal ghost, said reference signal being selected from a given part of a vertical sync signal of the video signal and the information (V/H SYNC) contained in said input signal including vertical and horizontal sync signals of the video signal, the generation timing of said first timing signal, second timing signal and correlation control signal being such that the operation of automatic equalization is regulated to eliminate the signal ghost from said equalized output signal.

14. An automatic equalizer of claim 13, wherein said transversal filter means includes a circuit coupled to said output terminal, a delay element through which said equalized output signal passes, the equalized output signal passed through said delay element being supplied to said first and second memory means.

* * * * *